United States Patent
Gaudin et al.

(10) Patent No.: US 11,842,300 B1
(45) Date of Patent: *Dec. 12, 2023

(54) EVALUATING OPERATOR RELIANCE ON VEHICLE ALERTS

(71) Applicant: STATE FARM MUTUAL AUTOMOBILE INSURANCE COMPANY, Bloomington, IL (US)

(72) Inventors: Kristopher Keith Gaudin, Bloomington, IL (US); Andrew Joseph Zeglin, Normal, IL (US); Joseph Harr, Bloomington, IL (US); Aaron Williams, Congerville, IL (US); Craig Cope, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/992,198

(22) Filed: Aug. 13, 2020

Related U.S. Application Data

(63) Continuation of application No. 16/053,877, filed on Aug. 3, 2018, now Pat. No. 10,783,725.

(Continued)

(51) Int. Cl.
G06Q 40/08 (2012.01)
(52) U.S. Cl.
CPC .................................... *G06Q 40/08* (2013.01)
(58) Field of Classification Search
None
See application file for complete search history.

(56) References Cited

U.S. PATENT DOCUMENTS 6,353,785 B1 3/2002 Shuman et al.
6,405,128 B1 6/2002 Bechtolsheim et al.
(Continued)

FOREIGN PATENT DOCUMENTS

WO 2001/063194 A1 8/2001
WO 2010/062899 A1 6/2010

OTHER PUBLICATIONS

Jermakian, Jessica S., et al. "Effects of an integrated collision warning system on teenage driver behavior." Journal of safety research 61 (2017): 65-75. (Year: 2017).*

(Continued)

*Primary Examiner* — David P Sharvin
*Assistant Examiner* — Brock E Turk
(74) *Attorney, Agent, or Firm* — Faegre Drinker Biddle & Reath LLP

(57) ABSTRACT

A system and computer-implemented method detect and act upon operator reliance to vehicle alerts. The system and method include receiving user profile data of an operator that includes a baseline of at least one driving activity aided by activation of an alert from a feature of an Advanced Driver Assistance System (ADAS). The system and method may include receiving historical ADAS alert frequency data including a history of at least one driving activity aided by activation of the alert from the ADAS feature. The system and method may compare the user profile data with the historical ADAS alert frequency data, determine a reliance level based upon the comparing, and set at least a portion of an operator profile associated with the operator with the reliance level. As a result, a risk averse driver, and/or proper responsiveness to vehicle alerts may be rewarded with insurance-cost savings, such as increased discounts.

17 Claims, 7 Drawing Sheets

Related U.S. Application Data

(60) Provisional application No. 62/563,722, filed on Sep. 27, 2017, provisional application No. 62/563,818, filed on Sep. 27, 2017, provisional application No. 62/563,808, filed on Sep. 27, 2017, provisional application No. 62/563,729, filed on Sep. 27, 2017.

(56) References Cited

U.S. PATENT DOCUMENTS

| | | | |
|---|---|---|---|
| 9,493,071 | B2 | 11/2016 | Lindhuber et al. |
| 9,892,573 | B1 | 2/2018 | Hsu et al. |
| 9,925,987 | B1 | 3/2018 | Nguyen |
| 10,755,356 | B1 | 8/2020 | Labarre et al. |
| 2007/0168915 | A1 | 7/2007 | Fabbio et al. |
| 2008/0243558 | A1 | 10/2008 | Gupte |
| 2009/0210257 | A1 | 8/2009 | Chalfant et al. |
| 2010/0082248 | A1 | 4/2010 | Dorum et al. |
| 2011/0054716 | A1 | 3/2011 | Staehlin et al. |
| 2012/0027248 | A1* | 2/2012 | Feris ............ H04N 7/18 382/103 |
| 2013/0110310 | A1 | 5/2013 | Young |
| 2013/0166098 | A1 | 6/2013 | Lavie et al. |
| 2013/0226400 | A1* | 8/2013 | King ............ G08G 1/167 701/468 |
| 2013/0317862 | A1* | 11/2013 | Fernandes ........ B60W 40/09 705/4 |
| 2014/0067206 | A1 | 3/2014 | Pflug |
| 2014/0129080 | A1 | 5/2014 | Leibowitz et al. |
| 2014/0266655 | A1 | 9/2014 | Palan |
| 2014/0272811 | A1 | 9/2014 | Palan |
| 2015/0006207 | A1 | 1/2015 | Jarvis et al. |
| 2015/0081404 | A1 | 3/2015 | Basir |
| 2015/0166059 | A1 | 6/2015 | Ko |
| 2015/0170253 | A1 | 6/2015 | Kim et al. |
| 2017/0032673 | A1 | 2/2017 | Scofield et al. |
| 2017/0072850 | A1* | 3/2017 | Curtis ............ G08G 1/166 |
| 2017/0088142 | A1 | 3/2017 | Hunt et al. |
| 2017/0221150 | A1* | 8/2017 | Bichacho ........ G06Q 40/08 |
| 2017/0261990 | A1 | 9/2017 | Lei et al. |
| 2017/0292848 | A1 | 10/2017 | Nepomuceno et al. |
| 2017/0369072 | A1 | 12/2017 | Huber |
| 2017/0369073 | A1 | 12/2017 | Huber |
| 2018/0047107 | A1 | 2/2018 | Perl et al. |
| 2018/0167407 | A1 | 6/2018 | Satoshi |

OTHER PUBLICATIONS

Jermakian et al., Effects of an integrated collision warning system on teenage driver behavior Journal of Safety Research, 61 (2017), pp. 65-75 (Year: 2017).

Navipedia, GPS Space Segment, 2011 (Year: 2011).

Van Sickle, "The Satellite Clock: Satellite Clock Drift" (Year: 2020).

* cited by examiner

EVALUATING OPERATOR RELIANCE ON VEHICLE ALERTS

CROSS-REFERENCE TO RELATED APPLICATIONS

The current patent application is a continuation of, and claims the benefit of, U.S. Pat. No. 10,783,725, filed Aug. 3, 2018 and entitled "Evaluating Operator Reliance on Vehicle Alerts," which claims the benefit of U.S. Provisional Patent Application No. 62/563,722, entitled "System and Method for Evaluating Driving Behavior" and filed on Sep. 27, 2017; U.S. Provisional Patent Application No. 62/563,729, entitled "Evaluating Operator Reliance on Vehicle Alerts" and filed on Sep. 27, 2017; U.S. Provisional Application No. 62/563,808, entitled "Automatically Tracking Driving Activity" and filed on Sep. 27, 2017; and U.S. Provisional Application No. 62/563,818, entitled "Automated Selection of a Vehicle" and filed on Sep. 27, 2017, all of which are incorporated herein in by reference in their entirety.

TECHNICAL FIELD

The present disclosure relates generally to evaluating driving behavior for a particular driving activity. More particularly, the present disclosure relates to detecting and acting upon operator reliance to vehicle alerts provided by an Advanced Driver Assistance System (ADAS) installed in the driven vehicle.

BACKGROUND

An Advanced Driver Assistance System (ADAS) installed in a vehicle may aid the operator of the vehicle by providing alerts in response to an operator's actions. In general; an ADAS may monitor various traffic conditions and/or the external environment surrounding the vehicle, and may take measurements of objects using radar or camera-based sensors, to assist the operator.

An example of an ADAS is a blind spot monitoring system. A blind spot monitoring system may provide alerts to an operator if a vehicle-based sensor device detects other vehicles located to the operator's side and/or rear, which may aid the operator when changing lanes. Another example of an ADAS is a lane departure warning system. A lane departure warning system may provide alerts to an operator if a vehicle-based sensor device detects that the vehicle is beginning to move out of its lane, which may aid the operator to stay in his or her lane. Other examples of an ADAS may include a forward collision warning system. However, driver reliance on ADAS systems may vary by individual, which may cause one or more drawbacks.

BRIEF SUMMARY

The present embodiments disclose systems and methods that may generally relate to evaluating a driving activity, and particularly, inter alia, to detecting and acting upon operator reliance to vehicle alerts provided by an Advanced Driver Assistance System (ADAS) installed in the driven vehicle. Proper responsiveness or unresponsiveness to valid or invalid vehicle alerts, respectively, by risk averse drivers may be monitored.

In one aspect, a computer-implemented method for detecting and acting upon operator reliance to vehicle alerts may be provided. The method may include: (1) receiving, by the processor, user profile data of an operator, the user profile data including a baseline of at least one driving activity aided by activation of an alert from a feature of an Advanced Driver Assistance System (ADAS); (2) receiving, by the processor, historical ADAS alert frequency, data including a history of at least one driving activity aided by activation of the alert from the ADAS feature; (3) comparing, by the processor, the user profile data with the historical ADAS alert frequency data; (4) determining a reliance level based upon the comparing; and/or (5) setting, by the processor, at least a portion of an operator profile associated with the operator with the reliance level. As a result, proper responsiveness or unresponsiveness to vehicle alerts by risk averse drivers may be monitored and/or rewarded, such as with lower insurance premiums or increased insurance discounts. The method may include additional, less, or alternate actions, including those discussed elsewhere herein.

In another aspect, a computer system for detecting and acting upon operator reliance to vehicle alerts may be provided. The system may include one or more processors, transceivers, and memory units storing instructions. When executed by the one or more processors, the instructions may cause the computer system to: (1) receive user profile data of an operator, the user profile data including a baseline of at least one driving activity aided by activation of an alert from a feature of an Advanced Driver Assistance System (ADAS); (2) receive historical ADAS alert frequency data including a history of at least one driving activity aided by activation of the alert from the ADAS feature; (3) compare the user profile data with the historical ADAS alert frequency data; (4) determine a reliance level based upon the comparing; and/or (5) set at least a portion of an operator profile associated with the operator with the reliance level. The computer system may include additional, less, or alternate functionality, including that discussed elsewhere herein.

In another aspect, a non-transitory, computer-readable medium (or media) stores instructions that, when executed by one or more processors, cause the one or more processors to: (1) receive user profile data of an operator, the user profile data including a baseline of at least one driving activity aided by activation of an alert from a feature of an Advanced Driver Assistance System (ADAS); (2) receive historical ADAS alert frequency data including a history of at least one driving activity aided by activation of the alert from the ADAS feature; (3) compare the user profile data with the historical ADAS alert frequency data; (4) determine a reliance level based upon the comparing; and/or (5) set at least a portion of an operator profile associated with the operator with the reliance level. The instructions may direct additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
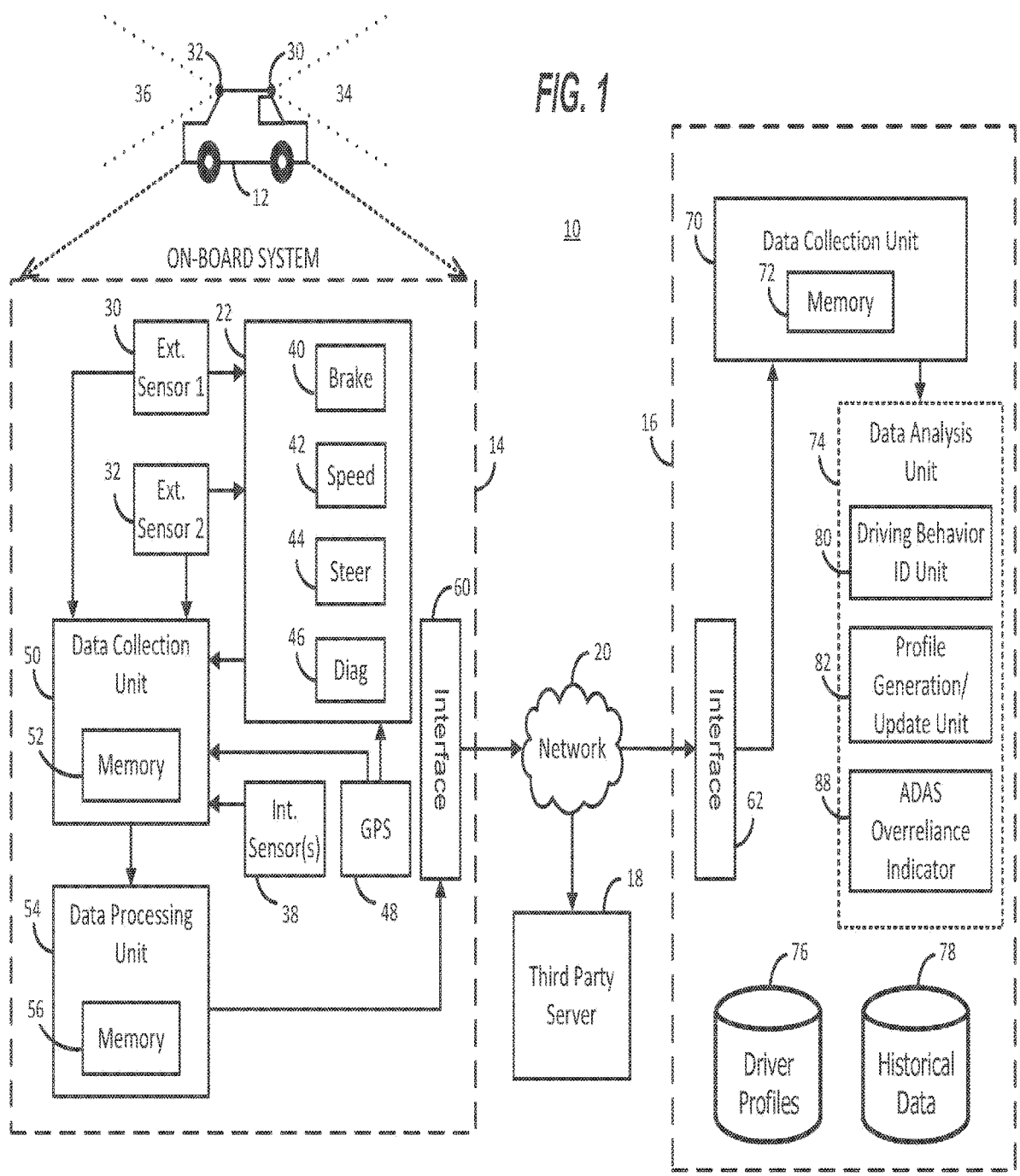
FIG. 1 is a block diagram of an exemplary computer system for identifying driving behavior, and generating, modifying, and/or using driver profiles.

The Figures depict aspects of the present invention for purposes of illustration only. One skilled in the art will readily recognize from the following discussion that alternate aspects of the structures and methods illustrated herein may be employed without departing from the principles of the invention described herein.

DETAILED DESCRIPTION

The embodiments described herein relate to, inter (Ilia, systems and techniques for identifying driving behavior, and/or generating, modifying, and/or using profiles for drivers/operators of vehicles. The operator profile may be generated and/or modified using vehicle telematics data indicative of how the operator/operator drives the vehicle (e.g., acceleration data, braking data, cornering data, etc.), data indicative of when and/or where the operator/operator drives the vehicle (e.g., GPS data), data indicative of the circumstances in which the operator/operator drives the vehicle (e.g., camera or other sensor data indicating the presence of passengers in the vehicle, the distance between the operator's vehicle and other vehicles, weather, time of day, geographic information, sunlight or night time, etc.), and/or other data (e.g., demographic information, dealership information regarding recalls or maintenance, etc.).

As the term is used herein, "vehicle telematics data" may include any suitable type or types of data provided by the vehicle (e.g., one or more sensors and/or subsystems of the vehicle), by a mobile electronic device carried or located within the vehicle (e.g., a smartphone or wearable electronic device of the operator), and/or by any other electronic device or component carried on or within the vehicle. Depending upon the context and the embodiment, for example, vehicle telematics data may include acceleration data generated by an electronic control system of the vehicle and/or by an accelerometer of the operator's mobile electronic device, GPS data provided by a GPS unit of the vehicle and/or a GPS unit of the mobile electronic device, speed and acceleration data, heading and direction data, route information, image or video data generated by a camera of the vehicle and/or a camera of the mobile electronic device, and so on.

In various different embodiments, the operator profiles may be used in different situations or scenarios. For example, the profiles may be used to adjust a price to risk model or insurance ratings (e.g., during initial underwriting, or when renewing a policy, etc.), to rate or showcase a driving instructor or student, to determine whether to provide a discount, and/or for other purposes. In some embodiments, the profile may include a rating that is indicative of the operator's personal responsibility or trustworthiness, and may be used in situations where such qualities are of particular importance. For example, ADAS reliance levels in driver profiles may be used to adjust driver credit ratings (e.g., when applying for a loan or credit line), to determine whether an "IOU" may be accepted from an individual, to determine whether candidates will be offered particular jobs, and so on.

In one embodiment, an ideal responsible driver may be characterized as an operator who does not over-rely on ADAS when driving, but rather, uses ADAS as an aid in appropriate situations. An operator that is over-reliant on ADAS may not be establishing or maintaining his or her general driving behavior, or may be losing his/her driving proficiency or skills. If a particular ADAS overly-relied upon is malfunctioning, disabled, or inoperable, or if a rental vehicle does not feature the particular ADAS overly-relied upon, the operator may not be prepared to safely drive the vehicle.

Additionally or alternatively, an ideal responsible driver may be characterized as an operator who minimally uses ADAS when driving, as opposed to never using ADAS at all, in appropriate situations. For example, if the operator's natural driving behavior of staying within a lane on a highway needs further training or practice, using a lane departure warning system may be safer than not using one at all, if there are no indications that the lane departure warning system in the vehicle is malfunctioning or inoperable, or providing erroneous alerts. The present embodiments may measure an operator's response to alerts from an ADAS that may be highly, probative of an operator's characteristics or qualities as it relates to risk averse driving behavior, and may incorporate such measurements into evaluating driving behavior.

EXEMPLARY ASPECTS

The present embodiments may relate to customer selection and use of ADAS systems, and/or pricing insurance to corresponding operator risk models or profiles. A number of hypotheses resolve around ADAS. For instance, good drivers may become bad drivers as they become dependent on ADAS instead of their natural good driving skills. For example, a driver may become reliant on a blind spot indicator instead of looking over their shoulder.

On the other hand, bad drivers may become artificially better drivers as they rely on ADAS systems to tell them when they are performing poorly and correct driver actions automatically. For example, emergency breaking may occur frequently, although no collision occurs.

Because of multiple false positives, a potentially unsafe environment may be created where the driver acknowledges the warning exists, but ignores taking action or deems not critical/accurate based upon previous experiences. For example, ADAS may ask the driver to place their hands on wheel due to an impending driver takeover. However, because of multiple false positives where no action was actually necessary, the driver knowingly ignores and the vehicles crashes.

Also, ADAS warning alerts may be ignored when drivers interpret the warning as not important or critical regardless of ADAS accuracy. For example, ADAS may warn the driver, and indicated that human takeover from autopilot is warranted. However, past driver conditioning causes the driver to deem the warning as not critical, increasing the likelihood of a vehicle collision.

Therefore, as ADAS adoption increases, ADAS dependence and/or reliance by drivers may result in difficulties in accurately determine potential or actual risk with safety features, vehicles, and/or operators.

The present embodiments may relate to collecting various data points to create a price to risk model. For instance, the data points may relate to: (i) previous driving/claim history; (ii) build sheet data; (iii) of ADAS features equipped on vehicle; (iv) ADAS on/off (manual vs auto); (v) history of ADAS system turned on/off (such as manually turning off Lane Departure Warning); (vi) collection of data showing how driver responds to or ignores ADAS warnings; (vii) # of times ADAS Triggers Per Vehicle Ignition (weighted Safety Impact and ROI on Safety); (viii) emergency breaking; (ix) lane keep; (x) lane departure warning; (xi) blind spot warning; (xii) front/rear cross traffic alert; (xiii) adaptive cruise control; (xiv) park assist; (xv) automatic high beam; (xvi) reaction baseline to ADAS engagement (how driver reacts to ADAS when enabled and activated); and/or (xvii) VR simulation to pre-rate.

Additionally or alternatively, the data points may relate to: knowledge and training on ADAS (or experience); speed; GPS location; frequency of vehicle rental annually; frequency of vehicle sharing annually; quality of vehicle brand and ADAS system; ambient traffic conditions (density, speed, time of day); rating should decrease over time as technology improves to newest model year; miles driven annually or times of day that commute typically happens; and/or exhibiting traits over time of good or preferred driving behaviors, especially in risky or heavy traffic environments.

Exemplary System for Generating, Modifying, & Using Driver Profiles

FIG. 1 is a block diagram of an exemplary computer system 10 for identifying driving behavior, and generating, modifying, and/or using driver profiles or operator profiles. The system 10 may include a vehicle 12 having an on-board system 14, as well as a computer system 16, a third party server 18, and a network 20. While FIG. 1 depicts vehicle 12 as an automobile, vehicle 12 may instead be a truck, motorcycle, or any other type of land-based vehicle capable of carrying at least one human passenger (including the operator).

Network 20 may be a single wireless network, or may include multiple cooperating and/or independent networks of one or more types (e.g., a cellular telephone network, a wireless local area network (WLAN), the Internet, etc.). On-board system 14 and third party server 18 may both be in communication with the computer system 16 via network 20. While FIG. 1 shows only a single vehicle 12 and a single third party server 18, it is understood that computer system 16 may communicate (e.g., via network 20) with any number of different vehicles e.g., one or more other vehicles similar to vehicle 12, with on-board systems similar to on-board system 14) and/or any number of different third party servers.

Third party server 18 may be a server of an entity that is not affiliated with either the operator of vehicle 12 or the entity owning, maintaining, and/or using computer system 16, and may be remote from computer system 16 and/or vehicle 12. For example, in various different embodiments discussed further below, third party server 18 may be a server associated with a provider of a mapping service, a provider of a weather information service, an auto repair shop, an auto maker, an auto dealership, an auto parts supplier, an entity that determines credit scores, and so on. As used herein, the term "server" may refer to a single server, or multiple servers communicating with each other.

On-board system 14 may include a first external sensor 30 and a second external sensor 32, each being configured to sense an environment external to vehicle 12 (i.e., to sense physical characteristics of the environment external to vehicle 12), such as a still image or video camera device, a lidar (laser remote sensing, or light detection and ranging) device, a radar device, or a sonar device, for example. Each of the external sensors 30, 32 may be located on or inside vehicle 12. For example, one or both of the external sensors 30, 32 may be permanently affixed to vehicle 12 (e.g., on the exterior or interior of the frame, on the dashboard, on the inner or outer surface of a windshield, etc.), or may be temporarily affixed to, or simply placed on or in, some portion of the vehicle 12 (e.g., placed on top of the dashboard, or in a device holder affixed to the windshield, etc.).

External sensor 30 and/or external sensor 32 may be included in a general purpose computing device (e.g., as a software application and associated hardware of a smartphone or other portable computer device), or may be a dedicated sensor device. In the exemplary system 10 shown in FIG. 1, external sensor 30 is located on or inside vehicle 12 such that it senses the environment in a forward-facing range 34, while external sensor 32 is located on or inside vehicle 12 such that it senses the environment in a rear-facing range 36. In some embodiments, the external sensor 30 and external sensor 32 may collectively provide a 360 degree sensing range. In other embodiments, however, the external sensor 30 and external sensor 32 may be redundant sensors (of the same type, or of different type) that each provide a 360 degree sensing range. In still other embodiments, either the external sensor 30 or external sensor 32 may be omitted, or the on-board system 14 may include more than two external sensors.

Each of external sensors 30, 32 may generate data, or analog information, that is indicative of the sensed external environment. In one embodiment where external sensor 30 is a digital video camera device, for example, external sensor 30 may generate data corresponding to frames of captured digital video. As another example, in one embodiment where external sensor 30 is a digital lidar device, external sensor 30 may generate data corresponding to frames of captured digital lidar information.

On-board system 14 may also include one or more internal sensors 38. In some embodiments, internal sensor(s) 38 may include one or more sensors designed to detect the presence of passengers. For example, internal sensor(s) 38 may include inward-facing digital cameras arranged to capture at least a portion of an interior (cabin) of vehicle 12, and/or one or more seat or weight sensors configured to detect the presence of the operator and/or passengers in the respective seat(s). As another example, internals sensor(s) 38 may instead (or also) include seatbelt sensors that are configured to detect when each seatbelt in vehicle 12 is engaged or not engaged. In certain embodiments where internal sensor(s) 38 include an inward-facing camera, the camera may be permanently affixed to vehicle 12 (e.g., on the interior of the frame, on the dashboard, on the inner surface of a windshield, etc.), or may be temporarily affixed to, or simply placed on or in, some portion of vehicle 12 (e.g., placed on top of the dashboard, or in a device holder affixed to the windshield, etc.), Moreover, a camera of internal sensor(s) 38 may be included in a general purpose computing device (e.g., as a software application and associated hardware of a smartphone or other portable computer device), or may be a dedicated sensor device.

On-board system 14 may also include an Advanced Driver Assistance System (ADAS) 22 that utilizes, but is not limited to utilizing, a braking subsystem 40, a speed subsystem 42, a steeling subsystem 44, a diagnostics subsystem 46, and/or one or more different subsystems not shown in FIG. 1. By utilizing any one or more of the aforementioned subsystems and/or sensors (e.g., sensors 30, 32, 38), ADAS 22 may include a forward collision warning feature, a blind spot indication feature, a cruise control feature, a lane departure warning feature, an automatic high beam feature, and other advanced driver assistance features for vehicle 12.

For example, ADAS 22 including a forward collision warning feature may employ speed subsystem 42, a radar device, a lidar device, and/or a camera device (e.g., external sensor 30) to detect an imminent crash, and/or a UPS subsystem (e.g., GPS 48) to detect fixed dangers associated with a particular registered location, such as an approaching stop sign. In some embodiments, the GPS subsystem 48 may generate data indicative of a current location of vehicle 12, and in other embodiments, the subsystem 48 may use other positioning techniques instead of GPS, such as cell tower triangulation, for example.

Once the detection is done, ADAS 22 may either provide an alert to vehicle 12 (e.g., via diagnostics subsystem 46) when there is an imminent collision or take action autonomously without any driver input, such as by braking, slowing speed, and/or steering (e.g., via braking subsystem 40, speed subsystem 42, and/or steering subsystem 44, respectively). ADAS 22 may also generate contextual data that describes characteristics of driving behavior (e.g., speeding, accelerating, braking, lane shifting, weaving patterns, cornering, etc.) that led to either activation of the alert or the autonomous action, via braking subsystem 40, speed subsystem 42, steering subsystem 44, diagnostics subsystem 46, and/or one or more different subsystems not shown in FIG. 1. Similarly, ADAS 22 including a blind spot indication feature may employ external sensor 32 to sense the environment in a rear-facing range 36.

ADAS 22 may be a combination of hardware and software components that provides data that may use one or more of the aforementioned subsystems and/or sensors to provide driver assistance for various driving activities. Such subsystems may be hardware, firmware and/or software subsystems that monitor and/or control various operational parameters of vehicle 12. As shown in FIG. 1, the diagnostics subsystem 46 may provide an alert to vehicle 12 when ADAS 22 has detected an event, such as another vehicle near the front, rear, or side of vehicle 12, lane departure, cruise control, or any other event ADAS 22 is configured to detect.

The diagnostics subsystem 46 may also generate other information pertaining to the operation of vehicle 12, such as alert information to indicate that one or more components of vehicle 12 is/are in need of replacement, an upgrade, and/or servicing. For example, diagnostics subsystem 46 may generate a service alert when tire pressure is low (e.g., based upon a signal from a tire pressure sensor not shown in FIG. 1), when the engine is overheating (e.g., based upon a temperature sensor in the engine compartment, also not shown in FIG. 1), when an oil change is recommended, and so on. Subsequent to, prior to, or independent of ADAS 22 providing an alert to the vehicle 12 when ADAS 22 has detected an event, the braking subsystem 40 may generate data indicative of how the brakes of vehicle 12 are applied (e.g., an absolute or relative measure of applied braking force, or a binary indicator of whether the brakes are being applied at all, etc.), the speed subsystem 42 may generate data indicative of how fast the vehicle 12 is being driven (e.g., corresponding to a speedometer reading, an accelerometer measurement, and/or an operator input such as depression of a gas pedal, etc.), and the steering subsystem 44 may generate data indicative of how the vehicle 12 is being steered (e.g., based upon the operator's manipulation of a steering wheel, or based upon automated steering control data, etc.).

The aforementioned braking subsystem 40, speed subsystem 42, steering subsystem 44, diagnostics subsystem 46, and/or one or more different subsystems not shown in FIG. 1 may also generate data indicating whether ADAS 22 has taken control autonomously (without any driver input) over the subsystems 40, 42, 44 for vehicle 12. For example, the speed subsystem 42 may generate data indicating whether a cruise control feature of ADAS 22 is currently activated, and/or the braking subsystem 40 or steering subsystem 44 may generate data indicating whether assisted braking and/or assisted steering features of ADAS 22 are currently activated. As other examples, a unit of on-board system 14 (e.g., diagnostics subsystem 46, or another unit not shown in FIG. 1) may generate data indicating whether vehicle 12 is in an automated transmission mode or a manual transmission mode, or whether the driving of vehicle 12 is currently subject to complete automated/machine control rather than manual (human) control.

In some embodiments, the on-board system 14 may not include one or more of the subsystems 40, 42, 44, 46, 48, one or both of external sensors 30 and 32, and/or internal sensor(s) 38, and/or the on-board system 14 may include additional devices or subsystems not shown in FIG. 1. Moreover, one or more subsystems in on-board system 14 may be included in a general purpose computing device such as a smartphone. For example, the GPS subsystem 48 may include a software application running on a smartphone that includes the appropriate hardware (e.g., an antenna and receiver).

On-board system 14 may also include a data collection unit 50 configured to receive data and/or analog signals from external sensors 30, 32, internal sensor(s) 38, some or all of subsystems 40, 42, 44, 46, 48, and/or ADAS 22. The data collection unit 50 may collect the data and/or analog signals substantially in real time, and in any of various different ways, according to different embodiments. In some embodiments, for example, the data collection unit 50 may periodically sample data and/or analog signals from the various external sensors 30, 32, internal sensor(s) 38, subsystems 40, 42, 44, 46, 48, and/or ADAS 22, or be notified by the respective sensors or subsystems when new data is available.

In some embodiments, the data collection unit 50 may receive data from one or more of the external sensors 30, 32, internal sensor(s) 38, one or more of subsystems 40, 42, 44, 46, 48 and/or ADAS 22 via a wireless link; such as a Bluetooth link. Alternatively, one or more of subsystems 40, 42, 44, 46, 48, internal sensor(s) 38, external sensors 30, 32 and/or ADAS 22 may provide data to data collection unit 50 via messages placed on a controller area network (CAN) bus (not shown in FIG. 1) or other suitable bus type, and/or via an on-board diagnostics (OBD) system (also not shown in FIG. 1). For example, the data collection unit 50 may collect information from one or more of subsystems 40, 42, 44, 46 via one or more OBD ports. In some embodiments, the data collection unit 50 may collect data using a mix of interface and/or bus types (e.g., a Bluetooth interface to receive data from sensors 30, 32 and internal sensor(s) 38, an OBD port to receive data from ADAS 22 and/or the diagnostics subsystem 46, and a CAN bus to receive data from subsystems 40, 42, 44).

In some embodiments where one or more of external sensors 30, 32, internal sensor(s) 38, one or more of subsystems 40, 42, 44, 46, 48, and/or ADAS 22 generate analog signals, either the respective sensors/subsystems/ADAS or the data collection unit 50 may convert the analog information to a digital format. Moreover, the data collection unit 50 may convert data received from one or more of external sensors 30, 32, internal sensor(s) 38, one or more of subsystems 40, 42, 44, 46, 48, and/or ADAS 22 to different digital formats or protocols. After collecting (and possibly converting) the data from the various sensors/subsystems/ADAS, the data collection unit 50 may store the data in a memory 52. The memory 52 may be any suitable type of data storage, such as a random access memory (RAM), a flash memory, or a hard drive memory, for example.

On-board system 14 may also include a data processing unit 54 that is coupled to the data collection unit 50. The data processing unit 54 may include one or more processors, or represent software instructions that are executed by one or more processors of on-board system 14, and may be configured to process the data collected by data collection unit 50 and stored in memory 52 for various purposes. In one embodiment, for example, data processing unit 54 simply packages data collected by data collection unit 50 into a format suitable for transmission to computing system 16. Alternatively, or in addition, data processing unit 54 may analyze the collected data to generate various types of information that may be used to update an operator profile, as discussed further below in connection with computing system 16. Data processing unit 54 may include, or be associated with, a memory 56 for storing outputs of the data analysis and/or other processing. Memory 56 may be any suitable type of data storage, such as a RAM, a flash memory, or a hard drive memory, for example. Memory 52 and memory 56 may be separate memories, or parts of a single memory, according to different embodiments.

Data processing unit 54 may be coupled to an interface 60, which may transmit the data received from data processing unit 54 to computer system 16 via network 20. Interface 60 may include a transmitter and one or more antennas, for example. In one alternative embodiment, interface 60 may instead be an interface to a portable memory device, such as a portable hard drive or flash memory device. In this embodiment, the portable memory device may be used to download data from memory 56 of data processing unit 54 or memory 52 of data collection unit 50, and may be manually carried to computer system 16 without utilizing network 20. In another alternative embodiment, a Bluetooth or other short-range link may be used to download data from memory 56 or memory 52 to a portable computer device (e.g., a laptop or smartphone), which may in turn be used to transmit the data to computer system 16 via network 20. In some embodiments, interface 60 may represent multiple types of different interfaces used for different types of data (e.g., a WLAN transceiver for data from external sensors 30, 32, a smartphone cellular transceiver for data from internal sensor(s) 38, and a flash memory device port for data from subsystems 40, 42, 44, 46, 48 and ADAS 22).

In some embodiments, the data generated by data processing unit 54 and stored in memory 56 may be automatically sent to interface 60 for transmission to computer system 16. For example, the data may be sent to interface 60 at regular time intervals (e.g., once per day, once per hour, etc.). In other embodiments, the data may be sent to computer system 16 in response to a query from computer system 16 that is received via network 20, or in any other suitable manner. Once the data is provided to computer system 16, the data may be subject to further processing to evaluate driving behavior for a particular driving activity (e.g., to determine an ADAS reliance level, to generate or modify a profile for the operator of vehicle 12 with the determined reliance level), as discussed further below.

Computer system 16 may be an electronic processing system (e.g., a server) capable of performing various functions, and may include an interface 62 configured to receive data from on-board system 14 of vehicle 12, and data from third party server 18, via network 20. Interface 62 may be similar to interface 60 of on-board system 14, for example. In certain embodiments where a portable memory device (rather than network 20) is used to transfer at least some of the data from on-board system 14 to computer system 16, interface 62 may include an interface to a portable memory device, such as a portable hard drive or flash memory device, for example.

Computer system 16 may also include a data collection unit 70 coupled to interface 62. Data collection unit 70 may be configured to receive/collect the data received by interface 62, and to store the collected data in a memory 72. Memory 72 may be any suitable type of data storage, such as a RAM, a flash memory, or a hard drive memory, for example. Data collection unit 70 may be coupled to a data analysis unit 74. Data analysis unit 74 may include one or more processors, or software instructions that are executed by one or more processors of computing system 16, and may be configured to process the data collected by data collection unit 70 and stored in memory 72 for various purposes according to different embodiments, as discussed further below.

Generally, data analysis unit 74 may analyze data from vehicle 12 (e.g., the data received from on-board system 14 via interface 60) and a number of other vehicles stored in historical driving data database 78 to evaluate driving behavior how an operator of vehicle 12 responded to false positive ADAS alerts, or alternatively, valid ADAS alerts, how often an operator of vehicle 12 relies on both false positive and valid ADAS alerts), determine an ADAS reliance level based upon the driving behavior, and generate and/or modify/update an operator profile stored in an operator profiles database 76 with the ADAS reliance level. Driver profiles database 76 and historical driving data database 78 may be stored in memory 72 or may be stored external to computer system 16 (e.g., memory 52 or other memory units).

In the exemplary system 10 of FIG. 1, data analysis unit 74 may include a driving behavior identification unit 80, a profile generation/update unit 82, and an ADAS overreliance indicator 88. In other embodiments, data analysis unit 74 does not include one or more of units 80, 82, 88, and/or includes additional units not shown in FIG. 1. For example, one or more of units 80, 82, 88 may instead be implemented by data processing unit 54 of on-board system 14 in vehicle 12, or may be entirely absent from system 10. In one embodiment, each of units 80, 82, 88 may include a set of instructions stored on a tangible, non-transitory computer-readable medium and capable of being executed by one or more processors of computer system 10 to perform the functions described below. In another embodiment, each of units 80, 82, and/or 88 may include a set of one or more processors configured to execute instructions stored on a tangible, non-transitory computer-readable medium to perform the functions described below.

Figure 3:
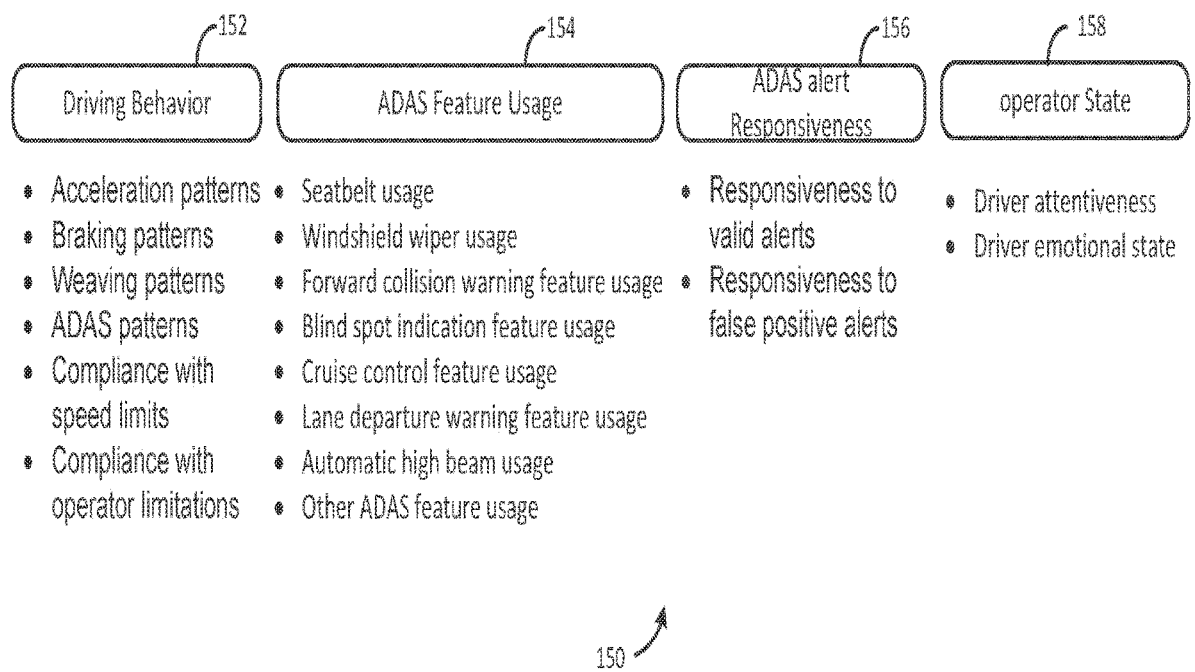
FIG. 3 depicts exemplary profile information categories that may be determined by the computer system of FIG. 1 when identifying driving behavior patterns and/or generating or modifying an operator profile.

Driving behavior identification unit 80 may be generally configured to analyze or process data received from vehicle 12 (e.g., from interface 60 of on-board system 14, as discussed above) to detect and/or identify various types of driving behaviors, as listed in driving behavior information 152 in FIG. 3. For example, driving behavior identification unit 80 may analyze data generated by any individual sensor, such as external sensor 30, to determine an average (and/or a minimum, etc.) tailgating distance between vehicle 12 and other vehicles in front of vehicle 12, and/or to determine proper/improper lane usage, etc.

As another example, driving behavior identification unit 80 may determine a first set of acceleration, braking, and/or weaving patterns of the operator of vehicle 12 and tag that set as being associated with the presence of one or more accompanied passengers, and determine a second set of acceleration, braking, and/or weaving patterns of the operator of vehicle 12 and tag that set as being associated with an absence of accompanied passengers. Driving behavior identification unit 80 may determine which sets correspond to the presence of one or more accompanied passengers using data generated by internal sensor(s) 38, for example.

Such sets of information may be probative of different driving behaviors associated with the operator of the vehicle 12 depending on whether other passengers are present in the vehicle 12, and may also be probative for the driving behavior identification unit 80 to determine how the operator responds to an alert provided by ADAS 22 depending on whether other passengers are in the vehicle 12. For example, upon analysis of the vehicle data from vehicle 12 via interface 60, if the driving behavior identification unit 80 determines that the first set of acceleration, braking, and/or weaving data of the operator of vehicle 12 shows a change in data when compared to vehicle data (e.g., data generated by subsystems 40, 42, 44, and/or 46 of ADAS 22) that caused a valid ADAS alert to be generated at the vehicle 12, driving behavior identification unit 80 may determine that the operator exhibited safe, risk averse, or responsive driving behavior by abiding by the valid ADAS alert. If the driving behavior identification unit 80 determines that the second set of acceleration, braking, and/or weaving data of the operator of vehicle 12 does not show a change in data when compared to vehicle data (e.g., data generated by subsystems 40, 42, 44, and/or 46 of ADAS 22) that caused a valid ADAS alert at the vehicle 12, driving behavior identification unit 80 may determine that a valid ADAS alert was not followed. Based upon a comparison of driving behaviors associated with the first and second sets, driving behavior identification unit 80 may also determine that the operator exhibits safer driving behavior when in the presence of one or more accompanied passengers.

As another example, driving behavior identification unit 80 may determine a first average tailgating distance of the operator of vehicle 12 and tag that distance as being associated with icy road conditions, determine a second average tailgating distance of the operator of vehicle 12 and tag that distance as being associated with wet road conditions, and/or determine a third average tailgating distance of the operator of vehicle 12 and tag that distance as being associated with dry road conditions. Driving behavior identification unit 80 may determine which distances correspond to the presence of icy, wet, or dry roads using data generated by external sensors 30 and/or 32, and/or data from a weather information service (e.g., in one embodiment where third party server 18 or another server not shown in FIG. 1 is associated with the weather information service), for example. Such tailgating distance information may be probative of different driving behaviors associated with the operator of the vehicle 12 depending on various road conditions, and may also be probative for the driving behavior identification unit 80 to determine how the operator responds to an alert provided by ADAS 22 in such road conditions.

Driving behavior identification unit 80 may be generally configured to analyze or process data received from stored historical data 78 to determine whether alerts from diagnostics subsystem 46 of ADAS 22 are false positive alerts or valid alerts. For example, if diagnostics subsystem 46 of ADAS 22 provides an alert at a location where historically, as indicated by the stored historical data 78, false positive alerts have been recorded, the driving behavior identification unit 80 may analyze the alert as a false positive alert. Similarly, if diagnostics subsystem 46 of ADAS 22 provides an alert at a location where historically, as indicated by the stored historical data 78, valid alerts have been recorded, the driving behavior identification unit 80 may analyze the alert as a valid alert. As another example, with respect to a lane departure warning feature of ADAS 22, if diagnostics subsystem 46 of ADAS 22 provides a lane departure alert when a turn signal has been activated by the operator of vehicle 12 (and therefore intending to shift lanes), the driving behavior identification unit 80 may analyze the alert as a false positive alert.

Driving behavior identification unit 80 may analyze or process contextual data generated by subsystems 40, 42, 44, and/or 46 of ADAS 22 to characterize the driving behavior (e.g., speeding, accelerating, braking, lane shifting, weaving patterns, etc.) that caused either activation of the alert (for both false positive and valid alerts) by ADAS 22 or the autonomous action by ADAS 22, The driving behavior identification unit 80 may also receive reaction data generated by subsystems 40, 42, and/or 44 of ADAS 22 to determine speeding, accelerating, braking, lane shifting, and/or weaving patterns of the operator of vehicle 12 in response to the alert generated by subsystem 46 of ADAS 22, and subsequently compare the contextual data with the reaction data. The driving behavior identification unit 80 may identify reaction data as data corresponding to a time-stamp tag just after the time (within a pre-determinable threshold) in which the alert was provided to vehicle 12.

A comparison of the identified reaction data with the contextual data may show whether the reaction data is consistent with the contextual data. A consistent correlation between reaction data and contextual data may represent a finding that an operator's driving behavior did not change in response to the alert (alternatively, an inconsistent correlation may indicate that operator's driving behavior did change, or that the operator took action). Further, a consistent correlation may represent either safe, risk averse, or responsive driving behavior, or alternatively, unsafe driving behavior. For instance, if the alert is classified as a false positive alert (e.g., based upon stored historical data 78), a consistent correlation indicates that the operator may have not followed or responded to the false positive alert, which may be indicative of safe or risk averse driving behavior.

However, if the alert is classified as a valid alert (e.g., based upon stored historical data 78), a consistent correlation may indicate that the valid alert was not followed, which may be indicative of unsafe, risky, and/or unresponsive driving behavior.

Similarly, an inconsistent correlation between reaction data and contextual data may, represent a finding that an operator's driving behavior did change in response to the alert. Further, an inconsistent correlation may represent either safe or unsafe driving behavior. For instance, if the alert is classified as a valid alert (e.g., based upon stored historical data 78), an inconsistent correlation indicates that the operator has taken action in response to the valid alert, which may be indicative of safe, risk averse, or responsive driving behavior. However, if the alert is classified as a false positive alert (e.g., based upon stored historical data 78), an inconsistent correlation indicates that the operator may have taken action in response to the false positive alert, which may be indicative of unsafe or risky driving behavior.

The comparison results of the identified reaction data with the contextual data, which shows whether the reaction data is consistent with the contextual data, may be stored in memory 72 or may be stored externally to computer system 16 (e.g., memory 52 or other memory units), and/or may be utilized by ADAS overreliance indicator 88 to generate or update a reliance level for the operator of vehicle 12. As will be discussed below, the reliance level may measure how often an operator of vehicle 12 relies on both false positive and valid ADAS alerts when compared to historical ADAS alert frequency data associated with the operator of vehicle 12 or other drivers of other vehicles that quantifies either how often the operator of vehicle 12 relied on both false positive and valid ADAS alerts previously, and/or how often other drivers of other vehicles relied on both false positive and valid ADAS alerts.

In some embodiments, each of one or more driving behaviors characterized by driving behavior identification unit 80 may be associated with tags or other metadata indicating the circumstances in which the driving behavior occurred. As briefly described above, driving behavior identification unit 80 may identify the contextual data generated by ADAS 22 as the data associated with a tagged first timestamp at the time ADAS 22 activated an alert or autonomous action, and may identify the reaction data generated by subsystems 40, 42, and/or 44 as the data associated with a tagged second timestamp that is just after the first timestamp (within a pre-determinable threshold), for example.

Driving behavior identification unit 80 may use other tags or other metadata associated with the contextual data and reaction data in order to pair them as a set to characterize driving behavior in response to an ADAS alert. For example, driving behavior identification unit 80 may identify contextual data and reaction data that are both associated with an operator's name or other identifier, in addition to the first and second timestamps, to character the particular driver's driving behavior in response to an ADAS alert. As another example, driving behavior identification unit 80 may identify contextual data and reaction data that are both associated with a location, in addition to the first and second timestamps, to characterize the general driving behavior (i.e., not to a particular driver) in response to an ADAS alert at the location.

In alternative embodiments, data processing unit 54, as opposed to driving behavior identification unit 80, may identify some or all of the driving behaviors. In such embodiments, driving behavior identification unit 80 may be excluded from data analysis unit 74, or may operate in conjunction with data processing unit 54. For example, data processing unit 54 may identify, some types of driving behaviors, while driving behavior identification unit 80 identifies other types of driving behaviors and/or higher-level driving behaviors. In one such embodiment, for instance, data processing unit 54 may determine tailgating distances to other vehicles using data from external sensor 30 and image recognition algorithms (e g to identify an object ahead of vehicle 12 as another vehicle), and driving behavior identification unit 80 may use that information, along with data from third party server 18 or another server, to determine an average tailgating distance for each of a number of different weather conditions (e.g., sunny, partly cloudy, cloudy, fog, rain, snow, icy roads, etc.).

Profile generation/update unit 82 may be generally configured to use the driving behaviors identified by driving behavior identification unit 80 and/or data processing unit 54, to populate and/or update fields of an operator profile for the operator of vehicle 12 in driver profiles database 76. Each of a number of different drivers (including the operator of vehicle 12) may be associated with a different profile in driver profiles database 76, with each profile having one or more fields of information.

Profile generation/update unit 82 may also be generally configured to receive the (ADAS) reliance level generated by ADAS overreliance indicator 88 to populate and/or update a reliance level field of an operator profile for the operator of vehicle 12 in driver profiles database 76. Although profile generation/update unit 82 and ADAS overreliance indicator 88 are shown as separate components of data analysis unit 74, in some embodiments, profile generation/update unit 82 may include the functionalities of ADAS overreliance indicator 88. In such embodiments, profile generation/update unit 82 may use the driving behaviors identified by driving behavior identification unit 80 and/or data processing unit 54, to generate a reliance level for the operator of vehicle 12 and populate and/or update the reliance level field of an operator profile for the operator of vehicle 12 in driver profiles database 76. In some embodiments, each profile may also include a number of fields indicative of demographic and/or personal information (e.g., gender, age, education level, profession, disabilities/impairments/limitations, etc.), vehicle information (e.g., vehicle model, year, and/or color), and/or other information.

ADAS overreliance indicator 88 may be generally configured to determine whether an operator is relying too heavily on ADAS 22 by comparing how frequently ADAS alerts are generated for the operator to historical ADAS alert frequency data. The historical ADAS alert frequency data may represent either driver-specific historical ADAS alert frequency records based upon the operator's driving profile, ADAS alert frequency records based upon profiles of other drivers, or a combination of both.

Specifically, in some embodiments, ADAS overreliance indicator 88 may receive a user profile data of the operator from profile generation/update unit 82. In other embodiments, ADAS overreliance indicator 88 may receive the user profile data of the operator from driver profiles 76. The user profile data of the operator may include a baseline of at least one driving activity aided by activation of an alert from a feature of ADAS. In some embodiments, ADAS overreliance indicator 88 may receive historical ADAS alert frequency data from historical data 78. In other embodiments, ADAS overreliance indicator 88 may receive historical ADAS alert frequency data from driver profiles 76. The historical ADAS alert frequency data includes a history of at least one driving activity aided by activation of an alert from the same ADAS feature for the operator and/or a plurality of drivers as in the baseline.

In order to determine whether an operator is relying too heavily on ADAS 22, the ADAS overreliance indicator 88 may then compare the user profile data with the historical ADAS alert frequency data, in some embodiments. For ease of computation, the historical ADAS alert frequency data may be represented by a mathematical average of the number of times an alert from the ADAS feature was activated for the operator and/or the plurality of drivers, but other mathematical representations are contemplated (e median, mode, etc.). In some embodiments, ADAS overreliance indicator 88 may select profiles of particular drivers that have common operational data 102 that are associated with activation of the alert from the ADAS as that of the operator. Upon selecting an operating parameter (i.e., one of the common operational data 102), ADAS overreliance indicator 88 may compare the user profile data associated with the selected operating parameter with the historical ADAS alert frequency data associated with the same selected operating parameter.

For example, if a profile for the operator of the vehicle 12 indicates that the lane departure alert at a particular location (e.g., 41.8789° N, 87.6359° W) was activated 5 times, ADAS overreliance indicator 88 may identify profiles of particular drivers that also indicate frequency occurrences of the lane departure alert at 41.8789° N, 87.6359° W. After calculating a mathematical average (e.g., 2) of the number of the lane departure alerts from the ADAS that were activated for the plurality of drivers from the identified profiles, AAS overreliance indicator 88 may compare the number of lane departure alerts for the operator of vehicle 12 (e.g., 5) with the average number of lane departure alerts from the identified profiles (e.g., 2) in order to determine whether the operator of vehicle 12 is relying too heavily on ADAS 22.

Based upon the comparison, ADAS overreliance indicator 88 may determine a reliance level for the operator in accordance with a threshold tolerance configured in ADAS overreliance indicator 88. For instance, the reliance level may indicate that the operator of the vehicle 12 relied too heavily on ADAS 22 (e.g., 5 is above a threshold tolerance in comparison to 2). ADAS overreliance indicator 88 may send the reliance level to the profile generation/update unit 82 for the profile of the operator to update or be set with the reliance level accordingly. In some embodiments, the ADAS overreliance indicator 88 may generate a notification including the reliance level (e.g., that the number of alerts exceeded the threshold tolerance) for display, such as at a monitor (not shown in FIG. 1) of computer system 16 and/or on-board system 14.

In some embodiments, the profile generation/update unit 82 may transmit the profile (or portion thereof) of the operator (with the reliance level information) to an entity that adjusts a price to risk model, credit rating, or insurance rating associated with the operator based upon the operator profile, or to an entity that reviews the operator profile in connection with a job sought by the operator offers a permanent or temporary credit, in connection with a good or service offered by the entity, based upon the operator profile. In some embodiments, the profile generation/update unit 82 itself may adjust a price to risk model, a credit rating, an insurance rating, a review, a permanent credit, or a temporary credit associated with the operator based upon the operator profile.

As another example, if a profile for the operator of the vehicle 12 indicates that the forward collision alert for a particular age (e.g., 21) was activated 5 times, ADAS overreliance indicator 88 may identify profiles of particular drivers that also indicate frequency occurrences of the forward collision alert for drivers that are 21 years of age. After calculating a mathematical average (e.g., 8) of the number of the forward collision alerts from the ADAS that were activated for the plurality of drivers from the identified profiles, ADAS overreliance indicator 88 may compare the number of forward collision alerts for the operator of vehicle 12 (e.g., 5) with the average number of forward collision alerts from the identified profiles (e.g., 8) in order to determine whether the operator of vehicle 12 is relying too heavily on ADAS 22.

Based upon the comparison, ADAS overreliance indicator 88 may determine a reliance level for the operator in accordance with a threshold tolerance configured in ADAS overreliance indicator 88. For instance, the reliance level may indicate that the operator of the vehicle 12 did not rely too heavily on ADAS 22 (e.g., 5 is below a threshold tolerance in comparison to 8). ADAS overreliance indicator 88 may send the reliance level to the profile generation/update unit 82 for the profile of the operator to update or be set with the reliance level accordingly. In some embodiments, the ADAS overreliance indicator 88 may generate a notification including the reliance level (e.g., that the number of alerts did not exceed the threshold tolerance) for display, such as at a monitor (not shown in FIG. 1) of computer system 16 and/or on-board system 14.

In some embodiments, the profile generation/update unit 82 may transmit the profile (or portion thereof) of the operator (with the reliance level information) to an entity that adjusts a price to risk model, credit rating, or insurance rating associated with the operator based upon the operator profile, or to an entity that reviews the operator profile in connection with a job sought by the operator offers a permanent or temporary credit, in connection with a good or service offered by the entity, based upon the operator profile. In some embodiments, the profile generation/update unit 82 itself may adjust a price to risk model, a credit rating, an insurance rating, a review, a permanent credit, or a temporary credit associated with the operator based upon at the operator profile.

As described above in some embodiments, in order to determine whether an operator is relying too heavily on ADAS 22, ADAS overreliance indicator 88 may compare the user profile data of the operator with the historical ADAS alert frequency data of the same driver. Specifically, ADAS overreliance indicator 88 may analyze the user profile of the operator by determining a baseline number of alerts during a first span of time, determining a number of alerts during a second span of time, and comparing the number of alerts during the second span of time to the baseline number of alerts during the first span of time, in order to determine whether the operator of the vehicle 12 relied too heavily on ADAS during the second span of time. For example, ADAS overreliance indicator 88 may determine from the profile of the operator that the vehicle 12 indicated 30 lane departure alerts during a span of 4 weeks in the month of June, and 60 lane departure alerts during a span of 4 weeks in the month of July.

ADAS overreliance indicator 88 may then compare the number of lane departure alerts during July (e.g., 60) with the baseline number of lane departure alerts during June e.g., 30) in order to determine whether the operator of vehicle 12 is relying too heavily on ADAS 22 for the month of July. Based upon the comparison, ADAS overreliance indicator 88 may determine a reliance level for the operator in accordance with a threshold tolerance configured in ADAS overreliance indicator 88. For instance, the reliance level may indicate that the operator of the vehicle 12 relied too heavily on ADAS 22 (e.g., 60 is above a threshold tolerance in comparison to 30).

ADAS overreliance indicator 88 may send the reliance level to the profile generation/update unit 82 for the profile of the operator to update accordingly. In some embodiments, the ADAS overreliance indicator 88 may generate a notification including the reliance level (e.g., that the number of alerts exceeded the threshold tolerance) for display, such as at a monitor (not shown in FIG. 1) of computer system 16 and/or on-board system 14. In some embodiments, the profile generation/update unit 82 may transmit the profile (or portion thereof) of the operator (with the reliance level information) to an entity that adjusts a price to risk model, credit rating, or insurance rating associated with the operator based upon the operator profile, or to an entity that reviews the operator profile in connection with a job sought by the operator offers a permanent or temporary credit, in connection with a good or service offered by the entity, based upon the operator profile. In some embodiments, the profile generation/update unit 82 itself may adjust a price to risk model, a credit rating, an insurance rating, a review, a permanent credit, or a temporary credit associated with the operator based upon at the operator profile.

The first span of time and the second span of time need not be an equivalent amount of time. For example, ADAS overreliance indicator 88 may determine from the profile of the operator that the vehicle 12 indicated 30 lane departure alerts during a span of 4 weeks in the month of June, and 60 lane departure alerts during a span of 2 weeks in the month of July. ADAS overreliance indicator 88 may then compare the number of lane departure alerts during July (e.g., 60) with the baseline number of lane departure alerts during June (e.g., 30) using a "common denominator" in order to determine whether the operator of vehicle 12 is relying too heavily on ADAS 22 for the month of July. For instance, ADAS overreliance indicator 88 may determine that 30 lane departure alerts during a span of 4 weeks in the month of June is the equivalent of 7.5 lane departure alerts per week, and that 60 lane departure alerts during a span of 2 weeks in the month of July is the equivalent of 30 lane departure alerts per week.

In some embodiments, in order to determine whether an operator is relying too heavily on ADAS 22, AAS overreliance indicator 88 may first adjust or re-establish the operator's baseline in response to a status change in at least one portion of the operator's profile, which may warrant in a change in the number of generated ADAS alerts. For example, the at least one portion of the operator's profile may indicate that the operator registered another driver (e.g., for the operator's spouse, the operator's child, etc.) to drive the vehicle 12. Additional authorized drivers of the vehicle 12 may increase the number of generated ADAS alerts. As another example, the operator may have moved to a different location that exhibits different driving conditions. A rural location may invite more cruise control alerts than an urban location, for example.

Profile generation/update unit 82 may use status information identified by data processing unit 54, such as age, dependencies, home address, to populate and/or update fields of an operator profile (e.g., adjust or re-establish the operator's baseline) for the operator of vehicle 12 in driver profiles database 76. Subsequently, ADAS overreliance indicator 88 may compare how frequently ADAS alerts are generated for the operator (after adjusting or re-establishing the operator profile) to historical ADAS alert frequency data, as described above.

In some embodiments, each driver profile may include a reliance level that indicates how often an operator of vehicle 12 relies on both false positive and valid ADAS alerts (e.g., as determined based upon various driving behaviors and/or other types of information that are probative of relying on AAS for assistance when driving). In such embodiments, ADAS overreliance indicator 88 may (i) receive a determination (e.g., from data analysis unit 74) whether alerts from ADAS 22 are false positive alerts or alternatively, valid alerts, (ii) receive comparison results of the identified reaction data (in response to either false positive warnings or alternatively, valid alerts) with the contextual data, which shows whether the reaction data is consistent with the contextual data, and (iii) compare how often the operator of vehicle 12 followed or responded to both false positive and valid ADAS alerts when compared to historical ADAS alert frequency data associated with the operator of vehicle 12 or other drivers of other vehicles, as described above. Whether the operator of vehicle 12 followed, or responded to, either a false positive ADAS alert or alternatively, a valid ADAS alert may affect the reliance level.

Specifically, the reliance level may be increased when the operator exhibits unsafe driving behavior, such as when (i) the alert is classified as a false positive alert, (ii) the reaction data is not consistent with the contextual data (or operator took action, or vehicle operation changed), and/or (iii) the operator of vehicle 12 followed or responded to the false positive ADAS alert in more instances than the operator has in the past, or in more instances than other drivers, according to historical ADAS alert frequency data associated with the operator of vehicle 12 or other drivers of other vehicles. The reliance level may also be increased when the operator exhibits unsafe driving behavior, such as when (iv) the alert is classified as a valid alert, (v) the reaction data is consistent with the contextual data (or operator took no action, or vehicle operation remained the same), and/or (vi) the operator of vehicle 12 has not followed or responded to the valid ADAS alert in more instances than the operator has in the past, or in more instances than other drivers, according to historical ADAS alert frequency data associated with the operator of vehicle 12 or other drivers of other vehicles.

Similarly, the reliance level may be lowered when the operator exhibits safe, or responsive, driving behavior, such as when (i) the alert is classified as a false positive alert, (ii) the reaction data is consistent with the contextual data (or operator took no action, or vehicle operation remained the same), and/or (iii) the operator of vehicle 12 did not follow the false positive ADAS alert in more instances than the operator has in the past, or in more instances than other drivers, according to historical ADAS alert frequency data associated with the operator of vehicle 12 or other drivers of other vehicles. The reliance level may also be lowered when the operator exhibits safe or responsive driving behavior, such as when (iv) the alert is classified as a valid alert, (v) the reaction data is not consistent with the contextual data (or operator took action, or vehicle operation changed), and/or (vi) the operator of vehicle 12 followed or responded to the valid ADAS alert in less instances than the operator has in the past, or in less instances than other drivers, according to historical ADAS alert frequency data associated with the operator of vehicle 12 or other drivers of other vehicles. In some embodiments, the reliance level may be increased when the operator exhibits safe or responsive driving behavior, and the reliance level may be lowered when the operator exhibits unsafe or unresponsive driving behavior.

While FIG. 1 depicts an embodiment in which vehicle telematics data may be generated and transmitted to computer 16 by an on-board system 14, in other embodiments some or all of the vehicle telematics data may instead be generated and/or transmitted to computer 16 by a mobile electronic device (e.g., a smartphone, a wearable electronic device, a mobile device equipped or configured with a telematics data generating/collecting application, and/or another mobile electronic device of the operator and/or a passenger of vehicle 12). For example, an accelerometer, gyroscope, compass, and/or camera of the operator's smartphone may be used to generate vehicle telematics data, which may be transmitted to computer 16 by either the smartphone itself or on-board system 14 (e.g., after the smartphone transmits the telematics data to on-board system 14 via a short-range communication technology such as WiFi or Bluetooth). In some embodiments where the operator's or passenger's mobile electronic device transmits some or all of the vehicle telematics data to computer 16, the mobile electronic device may include an interface (e.g., similar to interface 60) that is configured to transmit the data to computer 16 via network 20 or another network.

Figure 2:
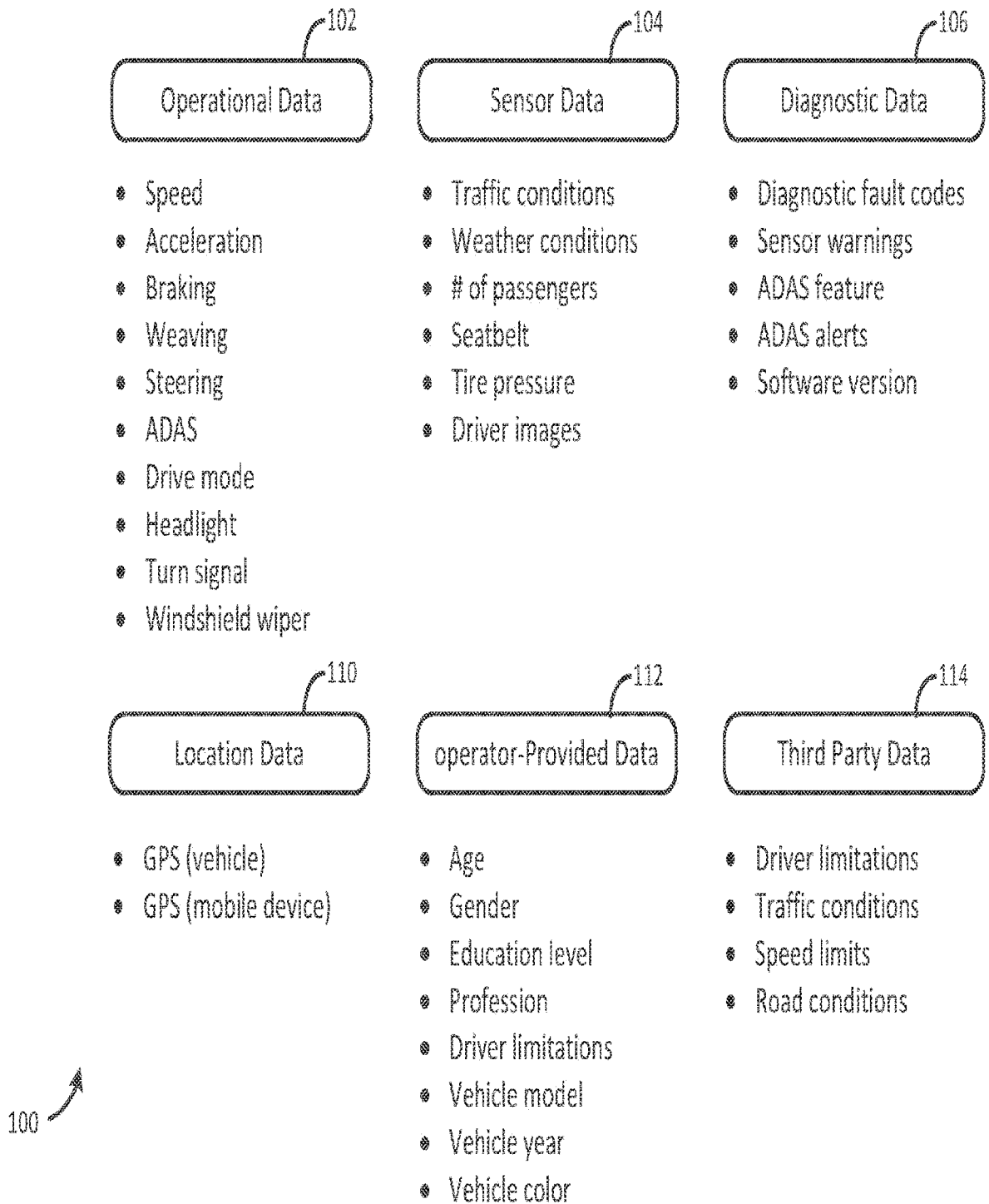
FIG. 2 depicts exemplary data categories that may be utilized by the computer system of FIG. 1 to identify driving behavior, and/or generate or modify an operator profile.

Exemplary Inputs for Identifying Driving Behavior and Generating or Modifying Driver Profiles FIG. 2 depicts exemplary data categories 100 that may be utilized by the system 10 of FIG. 1 to identify driving behavior, and/or generate or modify an operator profile, such as an operator profile included in driver profiles database 76 of computer system 16. The data categories 100 may include operational data 102, sensor data 104, diagnostic data 106, location data 110, driver-provided data 112, and/or third party data 114. In other embodiments, the data categories 100 may include more, fewer, and/or different categories of data, and/or each category shown in FIG. 2 may include more, fewer, and/or different types of data.

Operational data 102 may include one or more types of data relating to operation metrics of a vehicle, such as speed data, acceleration data, braking data, weaving data, steering data, ADAS data (e.g., whether/when a particular feature of ADAS is engaged), drive mode data (e.g., data indicating whether the operator selected a "comfort," "eco" or "sport" mode), headlight data (e.g., whether/when headlights are turned on), turn signal data (e.g., whether/when turn signals are used), and/or windshield wiper data (e.g., whether/when front and/or rear wipers are used). Some or all of operational data 102 may be data generated by subsystems 40, 42, 44, 46 and/or ADAS 22 of FIG. 1, one or more other subsystems of vehicle 12 not shown in FIG. 1, and/or a mobile electronic device of an operator or passenger.

Sensor data 104, which may overlap in definition with operational data 102 to some degree, may include one or more types of data indicative of internal and external conditions of a vehicle, and particularly conditions that may be captured by cameras, weight sensors, and/or other types of sensors. Sensor data 104 may include, for example, traffic condition data, weather condition data, data indicating the number of passengers in the vehicle, data indicating when particular seatbelts are used, data indicative of tire pressure, and/or driver image data. Some or all of sensor data 102 may be data generated by external sensor 30, external sensor 32, and/or internal sensor(s) 38 of FIG. 1, and/or by a mobile electronic device of an operator or passenger. For example, external sensor 30 and/or external sensor 32 may generate the traffic and/or weather data, internal sensor(s) 38 may generate the data indicative of number of passengers, seatbelt usage data, and/or driver image data, and a different sensor of vehicle 12 (not shown in FIG. 1) may generate the tire pressure data.

Diagnostic data 106 may include one or more diagnostic status codes indicative of the state of hardware and/or software systems of a vehicle, such as data indicative of safety alerts from various sensors (e.g., a check engine alert, a low tire pressure warning, an oil change reminder, etc.), data indicative of whether particular feature(s) of ADAS 22 are operational or malfunctioning (or disabled or inoperable), data indicative of alerts from ADAS 22, including timestamps associated with the alerts and/or data indicative of the current version of one or more units of software installed in the vehicle (e.g., for on-board system 14 of FIG. 1). Some or all of diagnostic data 106 may be data generated by diagnostic subsystem 46 of FIG. 1, for example.

Location data 110 may include one or more types of data indicative of vehicle location. For example, location data 110 may include location data obtained from a GPS unit installed in a vehicle (e.g., GPS subsystem 48 of FIG. 1), and/or location data obtained from a mobile device (e smartphone, smart watch, etc.) of the operator that includes a GPS unit.

Driver-provided data 112 may include one or more types of data specific to the operator and his or her vehicle, such as driver age, driver gender, driver education level, driver profession, driver limitations, vehicle model, vehicle year, and/or vehicle color. As the label suggests, driver-provided data 112 may be data that the operator provided (e.g., when filling out an application or other form or questionnaire). Alternatively, some or all of driver-provider data 112 may be obtained in a different manner (e.g., provided by a third party, similar to third party data 114).

Third party data 114 may include one or more types of data sourced by one or more third party entities. For example, third party data 114 may include data indicative of specific driver limitations (e.g., vision impairment, motor skill impairment, etc.), which may be obtained from a governmental entity or other entity. As another example, third party data 114 may include data indicative of traffic conditions, speed limits, and/or road conditions, which may be obtained from a governmental entity, an entity that provides a mapping service, or another entity.

As noted above, the data in the exemplary data categories 100 may be analyzed by the system 10 of FIG. 1 to identify driving behavior, and/or generate or modify an operator profile, such as an operator profile included in driver profiles database 76 of computer system 16. Various examples of how data shown in FIG. 2 may be used to determine patterns in driving behavior, such as risk averse driving behavior, and/or determine/set profile information are provided below in connection with FIG. 3.

Exemplary Information Determined for Driver Profiles

FIG. 3 depicts exemplary profile information categories 150 that may be determined by the system 10 of FIG. 1 (e.g., by data analysis unit 74) when identifying driving behavior patterns and/or generating or modifying an operator profile, such as an operator profile included in driver profiles database 76 of computer system 16. The profile information categories 150 may include driving behavior information 152, feature usage information 154, alert responsiveness information 156, and/or driver state information 158. In other embodiments, the profile information categories 150 may include more, fewer, and/or different categories than are shown in FIG. 3, and/or each category may include more, fewer, and/or different types of information than are shown in FIG. 3.

Driving behavior information 152 may include acceleration patterns, braking patterns, weaving patterns, ADAS usage patterns, compliance with speed limits, and/or compliance with driver limitations. For example, driving behaviors identification unit 80, or another unit of data analysis unit 74, may determine acceleration, braking, weaving patterns, and ADAS usage patterns by analyzing acceleration, braking, weaving data, and ADAS data from operational data 102 of FIG. 2 over a period of time, and/or analyzing historical data 78.

As another example, driving behaviors identification unit 80, or another unit of data analysis unit 74, may determine compliance with speed limits (e.g., a number of times in a particular time period that the posted speed limit is exceeded by more than 5 miles per hour, a maximum amount or percentage by which speed deviates below or above a posted speed limit in a particular time period, etc.) using speed data from operational data 102 (or using acceleration data of operational data 102 to determine speed), and speed limit data from third party data 114, of FIG. 2.

Driving behaviors identification unit 80, or another unit of data analysis unit 74, may determine compliance with driver-specific limitations using one or more types of data within operational data 102 of FIG. 2, one or more types of data within sensor data 104 of FIG. 2, and driver limitation data from third party data 114 of FIG. 2. For example, driving behaviors identification unit 80, or another unit of data analysis unit 74, may use data from external sensor 30 and speed subsystem 42 of FIG. 1 to determine one or more metrics indicating how closely an operator follows other vehicles ("tailgates") in relation to his or her speed due to an operator-specific limitation. Driving behaviors identification unit 80 or another unit of data analysis unit 74 may determine from the third party server 18 of FIG. 1 (e.g., a department of transportation within a state) or from the operator-provided data (e.g., driver limitations data) that he or she has a particular level of vision impairment (e.g., shortsightedness or poor night vision), motor skill impairment (e.g., due to a handicap or injury), and/or other medical conditions and/or physical characteristics that may limit how he or she can safely operate a vehicle.

Thereafter, driving behaviors identification unit 80 may determine whether the operator tends to follow other vehicles at a "safe" distance, in light of known correlations stored in one or more memory units (e.g., memory 72) between drivers with similar limitations and the occurrence of vehicle collisions. Other driving behaviors (e.g., braking patterns, weaving patterns, windshield wiper usage, etc.) may also, or instead, be analyzed in connection with any driver-specific limitations.

In some implementations, one or more of the types of information in driving behavior information 152 may be further subdivided based upon various conditions (e.g., traffic, weather conditions) in order to determine whether driving behavior changes based upon changing conditions. Specifically, driving behaviors identification unit 80, or another unit of data analysis unit 74, may correlate the sensor data 104 of FIG. 2 to the speed, acceleration, braking, weaving, ADAS data and other data from operational data 102 of FIG. 2 over a period of time. For example, some or all of the driving behavior information 152 may be associated with different weather conditions, different traffic conditions, different times and/or lighting conditions (e.g., day, evening, night, etc), different vehicle models (e.g., if profile information is separately determined for multiple vehicles of an operator), different types of roads/areas, different enabled ADAS features, and so on.

Thus, for instance, driving behavior information 152 may include compliance with speed limits (e.g., an indication of how often and/or long the operator exceeds the speed limit by a pre-determined threshold amount) for heavy traffic, and also compliance with speed limits for light and/or moderate traffic. As another example, driving behavior information 152 may include compliance with speed limits in school zones, as well as compliance with speed limits on interstate roads. As yet another example, driving behavior information 152 may include acceleration, braking, weaving, and ADAS usage patterns in clear weather, rainy, foggy, and/or snowy/icy weather, heavy traffic, light traffic, etc.

In some embodiments, driving behaviors identification unit 80, or another unit of data analysis unit 74, may correlate the sensor data 104 of FIG. 2 to the speed, acceleration, braking, weaving, ADAS data and other data from operational data 102 of FIG. 2, as well as to valid and false positive ADAS alerts determined by data analysis unit 74, over a period of time. For example, upon analysis of the vehicle data (e.g., sensor data 104 and operational data 102) from vehicle 12 via interface 60 and correlation of such data to valid and false positive ADAS alerts determined by data analysis unit 74, if the driving behavior identification unit 80 determines that a first set of acceleration, braking, and/or weaving data (e.g., from operational data 102) of the operator of vehicle 12 associated with heavy traffic (e.g., sensor data 104) shows a change in data when compared to vehicle data (e.g., from operational data 102, such as data generated by subsystems 40, 42, 44, and/or 46 of ADAS 22) that caused a valid ADAS alert to be generated at the vehicle 12, driving behavior identification unit 80 may determine that the operator exhibited safe, risk averse, or responsive driving behavior by abiding by the valid ADAS alert.

If the driving behavior identification unit 80 determines that a second set of acceleration, braking, and/or weaving data (e.g., from operational data 102) of the operator of vehicle 12 associated with light traffic (e.g., sensor data 104) does not show a change in data when compared to vehicle data (e.g., from operational data 102, such as data generated by subsystems 40, 42, 44, and/or 46 of ADAS 22) that caused a valid ADAS alert to be generated at the vehicle 12, driving behavior identification unit 80 may determine that the operator exhibited unsafe driving behavior by not following a valid ADAS alert. Based upon a comparison of driving behaviors associated with the first and second sets, driving behavior identification unit 80 may also determine that the operator exhibits safer driving behavior when in heavier traffic.

Feature usage information 154 may include forward collision warning feature usage, a blind spot indication feature usage, a cruise control feature usage, a lane departure warning feature usage, automatic high beam usage, and/or other ADAS feature usage, and may also be indicative of how often the operator uses one or more of the aforementioned features. The aforementioned usages may be road condition, weather and/or time-of-day dependent. For example, driving behaviors identification unit 80 or another unit of data analysis unit 74 may use ADAS data or other data from operational data 102, traffic condition data from sensor data 104, weather condition data from sensor data 104, and/or third party data 114 (e.g., road conditions data) to determine how often (and/or for how long) the operator uses any one or more features of ADAS 22 in various different road, traffic, and/or weather conditions. For illustrative purposes, feature usage information 154 is shown as its own distinct profile information category. However, feature usage information 154 may also be a subset or subdivision of driving behavior 152, namely, ADAS usage patterns.

ADAS alert responsiveness information 156 may include data corresponding to driver responsiveness to both false positive and valid ADAS alerts (e.g., forward collision warning, a blind spot indication warning, a cruise control warning, a lane departure warning, an automatic high beam warning, etc.). Particularly, alert responsiveness information 156 may include and/or utilize data such as diagnostic data 106 (e.g., data indicative of whether particular feature(s) of ADAS 22 are operational or malfunctioning or inoperable, data indicative of whether alerts from ADAS 22 were indicated to the operator and at what time, data indicative of whether the alerts from ADAS 22 were deactivated and at what time), and/or operational data 102 (e.g., data indicative of whether ADAS has been engaged in the vehicle, data indicative of operational data 102 that caused activation of the alerts from ADAS 22, data indicative of operational data 102 that caused deactivation of the alerts from ADAS 22) and possibly data from a third party such as data from third party server 18 of FIG. 1, to determine driver responsiveness to ADAS alerts.

Figure 4:
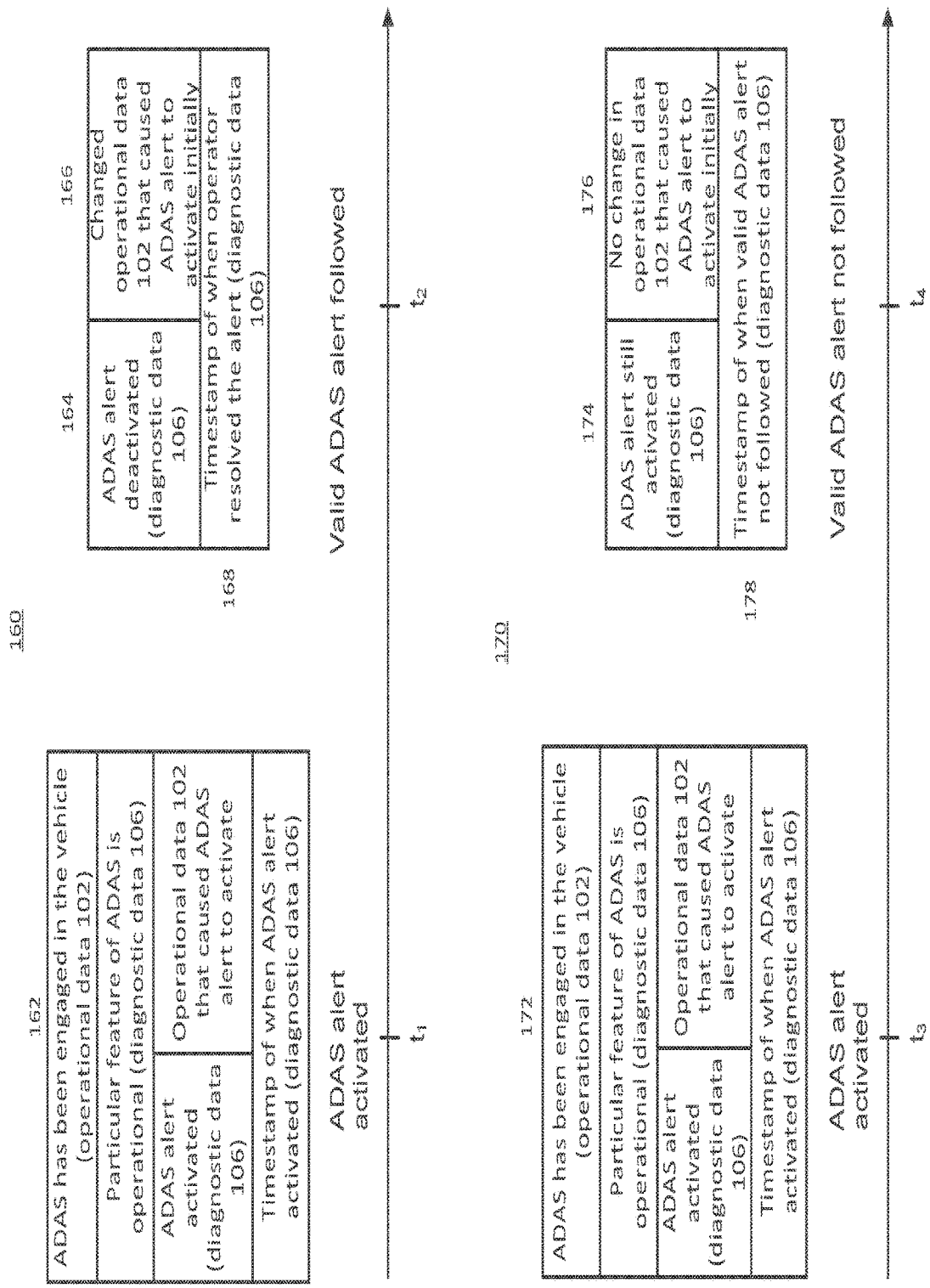
FIG. 4 depicts an exemplary scenario in which an operator followed a valid ADAS alert.

For example, as shown in FIG. 4, driving behaviors identification unit 80, or another unit of data analysis unit 74, may determine that the operator followed or responded to a valid ADAS alert, as described in scenario 160. After determining that data 162 suggests that a valid ADAS alert was indicated to the operator, driving behaviors identification unit 80, or another unit of data analysis unit 74, may determine that the ADAS alert has been deactivated (164) at a timestamp (168) subsequent to the timestamp of data 162 (e.g., the ADAS alert has been deactivated after a pre-determinable amount of time that has elapsed since the timestamp of data 162). Alternatively, driving behaviors identification unit 80, or another unit of data analysis unit 74, may determine that the operational data 102 that caused the ADAS alert to be indicated to the operator in the first place changed (166), or did not remain consistent, at a timestamp (168) subsequent to the timestamp of data 162 (e.g., the operational data 102 changed after a pre-determinable amount of time that has elapsed since the timestamp of data 162). Data analysis unit 74, particularly ADAS overreliance indicator 88, by comparing data 162 with data 164, 166, and 168 of scenario 160, along with historical ADAS alert frequency data associated with the operator of vehicle 12 or other drivers of other vehicles that shows that the operator of vehicle 12 followed or responded to the valid ADAS alert in less instances than the operator has in the past, or in less instances than other drivers, may lower a reliance level of the operator of vehicle 12.

Similarly, as shown in FIG. 4, driving behaviors identification unit 80 or another unit of data analysis unit 74 may determine that the operator did not follow a valid ADAS alert, as described in scenario 170. After determining that data 172 suggests that a valid. ADAS alert was indicated to the operator, driving behaviors identification unit 80, or another unit of data analysis unit 74, may determine that the ADAS alert still remains activated (174) at a timestamp (178) subsequent to the timestamp of data 172 (e.g., the ADAS alert still remains activated after a pre-determinable amount of time that has elapsed since the timestamp of data 172). Alternatively, driving behaviors identification unit 80 or another unit of data analysis unit 74 may determine that the operational data 102 that caused the ADAS alert to be indicated to the operator in the first place did not change (176), or remained consistent, at a timestamp (178) subsequent to the timestamp of data 172 (e.g., the operational data 102 did not change after a pre-determinable amount of time that has elapsed since the timestamp of data 172). As will be further described below, data analysis unit 74, by comparing data 172 with data 174, 176, and 178 of scenario 170, along with historical ADAS alert frequency data associated with the operator of vehicle 12 or other drivers of other vehicles that shows that the operator of vehicle 12 has not followed or responded to the valid ADAS alert in more instances than the operator has in the past, or in more instances than other drivers may increase a reliance level of the operator.

Figure 5:
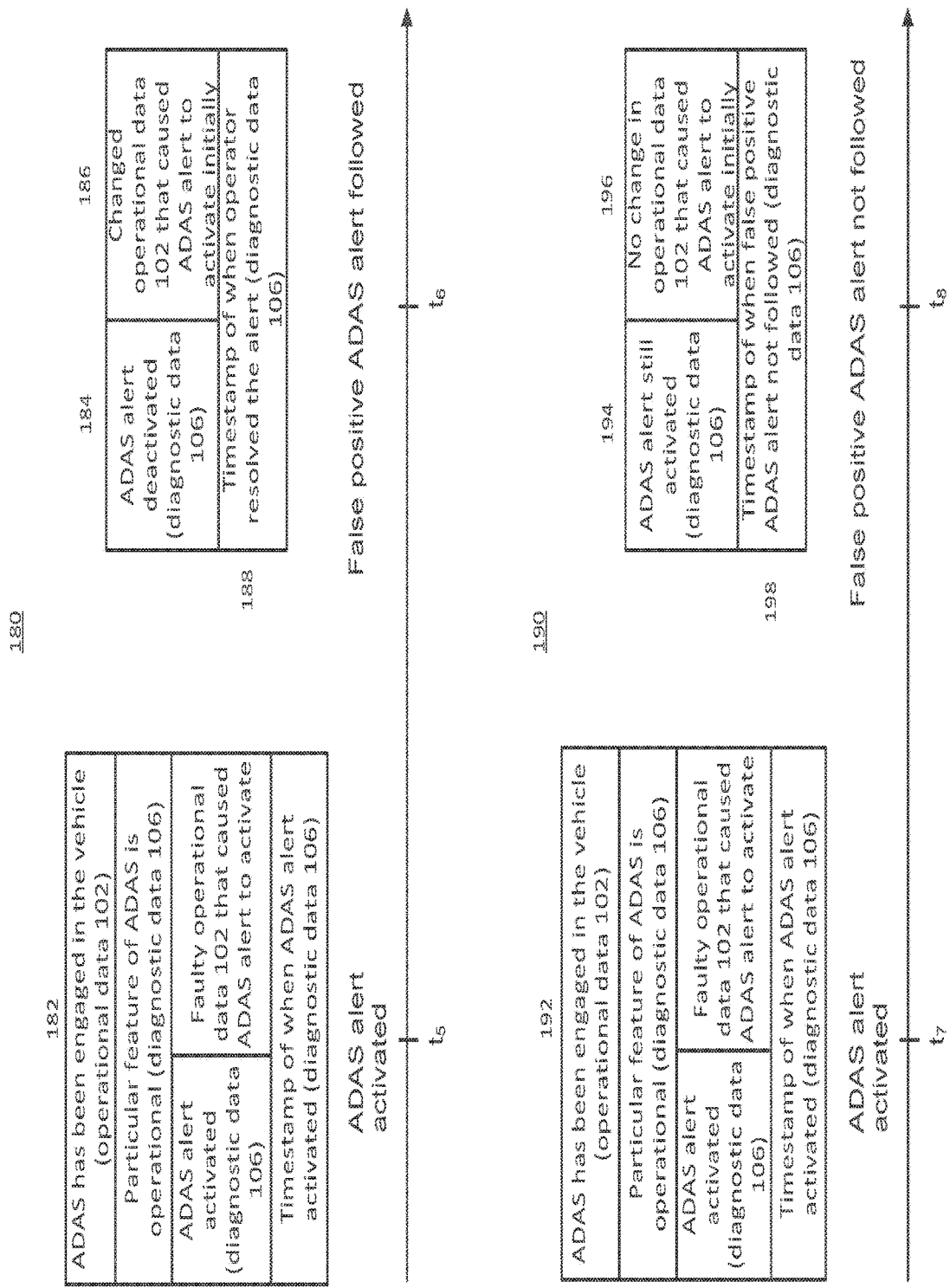
FIG. 5 depicts an exemplary scenario in which a false positive ADAS alert was issued.

As another example, as shown in FIG. 5, driving behaviors identification unit 80, or another unit of data analysis unit 74, may determine that the operator followed or responded to a false positive ADAS alert, as described in scenario 180. After determining that data 182 suggests that a false positive ADAS alert was indicated to the operator, driving behaviors identification unit 80, or another unit of data analysis unit 74, may determine that the ADAS alert has been deactivated (184) at a timestamp (188) subsequent to the timestamp of data 182 (e.g., the ADAS alert has been deactivated after a pre-determinable amount of time that has elapsed since the timestamp of data 182). Alternatively, driving behaviors identification unit 80, or another unit of data analysis unit 74, may determine that the operational data 102 that caused the ADAS alert to be indicated to the operator in the first place changed (186), or did not remain consistent, at a timestamp (188) subsequent to the timestamp of data 182. (e.g., the operational data 102 changed after a pre-determinable amount of time that has elapsed since the timestamp of data 172). As will be further described below, data analysis unit 74, by comparing data 182 with data 184, 186, and 188 of scenario 180, along with historical ADAS alert frequency data associated with the operator of vehicle 12 or other drivers of other vehicles that shows that the operator of vehicle 12 followed or responded to the false positive ADAS alert in more instances than the operator has in the past, or in more instances than other drivers, may increase a reliance level of the operator of vehicle 12.

Similarly, as shown in FIG. 5, driving behaviors identification unit 80, or another unit of data analysis unit 74, may determine that the operator did not follow a false positive ADAS alert, as described in scenario 190. After determining that data 192 suggests that a false positive ADAS alert was indicated to the operator, driving behaviors identification unit 80, or another unit of data analysis unit 74, may determine that the ADAS alert still remains activated (194) at a timestamp (198) subsequent to the timestamp of data 192 (e.g., the ADAS alert still remains activated after a pre-determinable amount of time that has elapsed since the timestamp of data 192). Alternatively, driving behaviors identification unit 80, or another unit of data analysis unit 74, may determine that the operational data 102 that caused the ADAS alert to be indicated to the operator in the first place did not change (196), or remained consistent, at a timestamp (198) subsequent to the timestamp of data 192 (e.g., the operational data 102 did not change after a pre-determinable amount of time that has elapsed since the timestamp of data 192). As will be further described below, data analysis unit 74, by comparing data 192 with data 194, 196, and 198 of scenario 190, along with historical ADAS alert frequency data associated with the operator of vehicle 12 or other drivers of other vehicles that shows that the operator of vehicle 12 did not follow the false positive ADAS alert in more instances than the operator has in the past, or in more instances than other drivers, may lower a reliance level of the operator of vehicle 12.

Referring back to FIG. 3, driver state information 158 may include driver attentiveness and/or driver emotional state. For example, driving behaviors identification unit 80, or another unit of data analysis unit 74, may determine how attentive (or responsive) an operator is (e.g., gaze direction, how often he or she checks instruments and/or the rearview mirror, how often he or she checks an ADAS alert, etc.) by using image recognition and/or other image processing techniques to process driver image data from sensor data 104 of FIG. 2. As another example, driving behaviors identification unit 80, or another unit of data analysis unit 74, may determine an operator's emotional state and/or level of attentiveness (e.g., calm, angry, distracted, etc.) by using image recognition and/or other image processing techniques to process driver image data from sensor data 104. In some embodiments, driving behaviors identification unit 80, or another unit of data analysis unit 74, may correlate the operator state information 158 with the sensor data 104 and operational data 102 of FIG. 2, as well as to valid and false positive ADAS alerts determined by data analysis unit 74, over a period of time, to identify driving behavior and/or generate/modify driver profiles.

Some or all of the types of profile information discussed above, and/or other types of information, may be used (e.g., by profile generation/update unit 82 of FIG. 1) to populate and/or update one or more profile fields of a profile for a particular driver. For example, profile generation/update unit 82 may use some or all types of profile information within driving behavior information 152, feature usage information 154, alert responsiveness information 156, and/or driver state information 158 as profile field values, and/or also incorporate the reliance level based upon some or all types of driving behavior information 152, feature usage information 154, alert responsiveness information 156, and/or driver state information 158. Therefore, such a profile may provide various driving behaviors of an operator, such as the operator's preferred ADAS features, responsiveness to the preferred ADAS features, etc.

When ADAS overreliance indicator 88 calculates the reliance level, various profile information types and/or categories may be more heavily weighted than others. For example, responsiveness to ADAS alerts may be weighted more heavily than weather-specific windshield wiper usage. Generally, specific types of profile information may be used to determine the reliance level if it is known a priori (e.g., from past correlations with driver actions) or believed that those types of information are probative of how trustworthy or responsible the operator is.

The reliance level may be determined using, in addition to historical ADAS alert frequency data, various types of information shown in FIG. 3, and also using information about the operator and/or vehicle (e.g., data included in driver-provided data 112 of FIG. 2, such as age, gender, education level, profession, vehicle model, etc.) As just one more specific example, the reliance level or other information in an operator profile may be based at least in part upon a joint consideration of (1) a color of the vehicle, (2) times of day when the vehicle is driven (or city or rural driving, or daytime or night time driving), (3) weather in which the vehicle is driven (e.g., in view of the assumption or known correlation that vehicles of certain colors may be less visible at certain times of day and/or in certain types of weather), and (4) ADAS alert responsiveness (e.g., from information 156).

Exemplary Use Cases for Driver Profiles

Once an operator profile is determined (e.g., generated or updated using some or all of the profile information shown in FIG. 2, FIG. 3, and/or other types of information), one or more fields of the profile may be used in any of a number of different ways, depending upon the embodiment.

In some embodiments, the operator profile may be used in connection with driver education and/or licensing. For example, situation-specific driving behaviors reflected in the profile (e.g., driving behavior in specific types of weather and/or traffic) may be used by a government entity for licensing or re-licensing of drivers. As another example, driver profiles may be used to rate how well or responsibly a driving instructor drives, and/or how well or responsibly his or her students drive (with the latter ratings potentially also being used to rate the instructor). In some embodiments such as these, driver profile information may be transmitted to a remote computing system (e.g., third party server 18 of FIG. 1) for display to one or more individuals positioned to act upon the information (e.g., to approve the grant of a license, or provide a performance review to an instructor, etc.).

In still other embodiments, driver profiles may be used to adjust costs for usage-based insurance and/or other insurance premiums. For example, an underwriting department of an insurer may use driver profile information to gauge risk and set appropriate premiums. Alternatively, the costs of usage-based insurance may be automatically calculated by a computing system (e.g., computer system 16 of FIG. 1) based upon the operator profile information.

In still other embodiments, driver profiles may be used to influence resale values of vehicles. In particular, driver profile information indicative of how aggressively or conservatively the operator drove the vehicle may cause the value to go down or up, respectively. In certain embodiments such as these, driver profile information may be transmitted to a remote computing system (e.g., third party server 18 of FIG. 1, or a personal computing device of a potential buyer, etc.) for display to one or more individuals positioned to act upon the information (e.g., set the vehicle resale price, or buy the vehicle).

In still other embodiments, driver profiles may be used by fleet owners to provide rental vehicle discounts. For example, driver profile information may be transmitted to a remote computing system (e.g., third party server 18 of FIG. 1) for display to one or more individuals positioned to act upon the information (e.g., an agent who can apply the discount), or to cause the discount to be automatically applied to a rental fee.

In still other embodiments, driver profiles may be used by car sharing services to provide discounts. For example, driver profile information may be transmitted to a remote computing system (e.g., third party server 18 of FIG. 1) for display to one or more individuals positioned to act upon the information (e.g., an agent who can apply the discount), or to cause the discount to be automatically applied to a car share fee.

In still other embodiments, driver profiles may be used for other purposes, such as determining how a particular individual would likely care for, maintain, or be compatible with driving a vehicle (e.g., a rental vehicle with or without ADAS features, autonomous vehicle, etc.), estimating how long vehicle components (e.g., tires, brake pads, rotors, etc.) will last, and so on.

In some embodiments where driver profiles include reliance levels (as discussed above), such reliance levels may be used in a number of different situations where the operator's trustworthiness or driving behavior is important. For example, the reliance level may be used by an insurance entity to adjust a price to risk model associated with the operator based upon the operator's reliance level. In some embodiments such as these, reliance level may be transmitted to a remote computing system (e.g., third party server 18 of FIG. 1) for display to one or more individuals positioned to act upon the information (e.g., authorize price to risk model adjustment), and/or for automated adjustment of the price to risk model.

As another example, the reliance level may be used by a credit rating entity to raise or lower the operator's credit score. In some embodiments such as these, reliance levels may be transmitted to a remote computing system (e.g., third party server 18 of FIG. 1) for display to one or more individuals positioned to act upon the information (e.g., authorize a credit score change), and/or for automated adjustment of the credit score.

As another example, the reliance level may be submitted to an employer in connection with a resume and/or application for a particular job. A reliance level may be especially pertinent to jobs that involve frequent driving, such as an operator for restaurant delivery, a ride-sharing driver, etc. In some embodiments such as these, a reliance level may be transmitted to a remote computing system (e.g., third party server 18 of FIG. 1) for display to one or more individuals positioned to act upon the information (e.g., hire the individual associated with the reliance level).

As yet another example, the reliance level may be used to enable "IOUs" with particular service providers (e.g., a taxi service, ride-sharing service, etc.). In some embodiments such as these, reliance levels of driver profiles may be transmitted to a remote computing system (e.g., third party server 18 of FIG. 1), after which the computing system may indicate to one or more agents of the service provider that an IOU may be accepted from the individual.

In another embodiment, reliance levels need not be transmitted to a remote computing system. The data analysis unit 74 or data processing unit 54 themselves may adjust the price to risk model, credit rating, insurance rating, review, permanent credit, or temporary credit associated with the operator based upon at least the portion of the operator profile.

Figure 6:
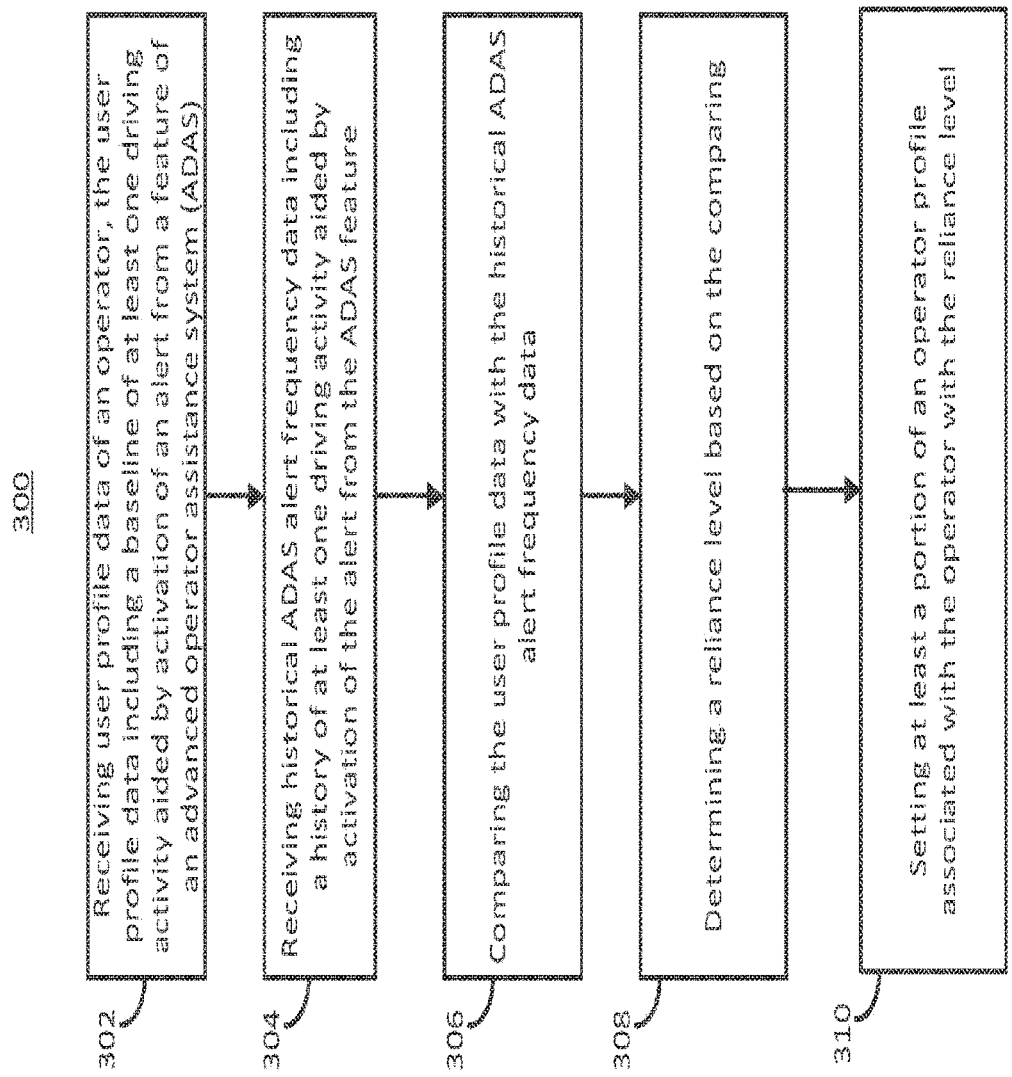
FIG. 6 is a flow diagram of an exemplary computer-implemented method for detecting and acting upon operator reliance to vehicle alerts provided by ADAS.

Exemplary Computer-Implemented Method for Detecting & Acting Upon Operator Reliance to Vehicle Alerts FIG. 6 is a flow diagram of an exemplary computer-implemented method 300 for detecting and acting upon operator reliance to alerts provided by ADAS 22. The method 300 may be implemented by data analysis unit 74 or data processing unit 54 of FIG. 1, for example.

In the method 300, data analysis unit 74 or data processing unit 54 may receive user profile data of an operator, which may include a baseline of at least one driving activity aided by activation of an alert from a feature of an Advanced Driver Assistance System (ADAS) (block 302). The user profile data may be based upon vehicle data received from an on-board system of a vehicle (e.g., on-board system 14 of vehicle 12 in FIG. 1). The baseline refers to a particular status of the operator of vehicle 12. For example, if the operator of vehicle 12 is single (i.e., not married and/or has no children), the operator's baseline may be associated with a vehicle that does not have any dependents also driving the vehicle. In contrast, if the operator of vehicle 12 is married and has children, the operator's baseline may be associated with a vehicle that does have dependents that also drive the vehicle. As another example, if the operator of vehicle 12 moves from a rural area to an urban area, the baseline of the operator may change that is, from a baseline associated with a vehicle that is driven in relatively light traffic, to another baseline associated with a vehicle that is driven in relatively heavy traffic.

The user profile data may include information that indicates that the on-board system, via ADAS 22, indicated a forward collision warning feature, a blind spot indication feature, a cruise control feature, a lane departure warning feature, an automatic high beam feature, and/or other advanced driver assistance features. Data analysis unit 74 or data processing unit 54 may track and/or record the time and/or location as to when the on-board system of the vehicle has indicated the alert to the operator. The time may be determined as a specific time (e.g., corresponding to a time stamp), or a time range (e.g., on or before a particular date), for example. In addition, data analysis unit 74 or data processing unit 54 may determine whether alerts from ADAS 22 are false positive alerts, or alternatively valid alerts, by analyzing data from vehicle L. (e.g., the data received from on-board system 14 via interface 60) and a number of other vehicles stored in historical driving data database 78.

The user profile data may include vehicle data that caused activation of an alert of ADAS 22 that was generated by the on-board system of the vehicle (e.g., by diagnostic subsystem 46 of on-board system 14 in FIG. 1). The vehicle data may include one or more operational data 102, sensor data 104, diagnostic data 106, location data 110, driver-provided data 112, and/or third party data 114 of FIG. 2, and may further include a plurality of time stamps associated with one or more of the vehicle data. In one embodiment where the method 300 is implemented by a server remote from the vehicle (e.g., a server of computer system 16 of FIG. 1), the vehicle data may be received at the server, from the on-board system, via a wireless link (e g via network 20 of FIG. 1).

For example, if method 300 has determined that a lane departure alert provided by ADAS 22 has been presented to the operator, method 300 may receive user profile data associated with the lane departure alert, such as operational data 102 (e.g., whether a turn signal has been activated at the time the lane departure alert was provided by ADAS 22, steering data), sensor data 104 (e.g., driver images of whether a vehicle is straddling a lane at the time the lane departure alert was provided by ADAS 22), diagnostic data 106 (e.g., whether the software version of the lane departure warning feature is up to date at the time the lane departure alert was provided by ADAS 22), location data 110 (e.g., where the vehicle was located at the time the lane departure alert was provided by ADAS 22), driver-provided data 112 (e.g., vehicle model), and/or third party data 114 (e.g., road conditions which may indicate whether the lane has been clearly indicated with visible lane markings).

The user profile data not only may serve to describe characteristics of the driving activity at the time an ADAS alert has been provided, but may also may serve to assist in classifying whether an alert is a false positive alert, or alternatively a valid alert. For example, if the operator images show that a vehicle is not leaving a lane at the time the lane departure alert was provided by ADAS 22, or if the operational data 102 shows that a turn signal has been activated at the time the lane departure alert was provided by ADAS 22, the data analysis unit 74 or data processing unit 54 may determine that the alerts from ADAS 22 are false positive alerts.

The method 300 may then receive historical ADAS alert frequency data including a history of at least one driving activity aided by activation of the alert from the ADAS feature (block 304). The historical ADAS alert frequency data may be in a database (e.g., historical driving data database 78) saved in a memory unit e.g., memory 72), and may be associated with driving behavior of the operator or other drivers. The historical ADAS alert frequency data may also be associated with a plurality of baselines. For instance, there may be a first subset of historical ADAS alert frequency data that is associated with single drivers (i.e., not married and/or has no children), and a second subset of historical ADAS alert frequency data that is associated with the operator's home location.

The historical ADAS alert frequency data, as the name implies, indicates how often ADAS alerts have been historically activated (or not activated), either in vehicle 12, or other vehicles, and vehicle data that caused the ADAS alerts to activate. The vehicle data may include one or more operational data 102, sensor data 104, diagnostic data 106, location data 110, driver-provided data 112, and/or third party data 114 of FIG. 2, and may further include a timestamp and/or location associated with one or more of the vehicle data. For example, historical ADAS alert frequency data may indicate that a lane departure alert was activated by ADAS 22 an average of 100 times during July 1 July 15 for single drivers that live in downtown Chicago, and corresponding vehicle data, such as operational data 102 (e.g., steering data) and sensor data 104 (e.g., driver images of whether a vehicle is straddling a lane), that caused activation of the lane departure alert.

The method 300 may then compare the user profile data with the historical ADAS alert frequency data (block 306). The comparison may be based upon a common baseline. For example, if the user profile data indicates that the operator of vehicle 12 is single (e.g., the operator's baseline is associated with a vehicle that does not have any dependents also driving the vehicle), method 300 may compare the user profile data with the first subset of historical ADAS alert frequency data that indicates a baseline that is associated with single drivers, as described above. As another example, if the user profile data indicates that the home location of the operator of vehicle 12 is an urban area (e.g., the operator's baseline is associated with downtown Chicago), method 300 may compare the user profile data with the second subset of historical ADAS alert frequency data that indicates a baseline that is associated with urban home locations, as described above.

The method may then determine a reliance level based upon the comparing (block 308). Generally, the reliance level may indicate an evaluation of a driving behavior for a particular driving activity of the operator, where the driving behavior may cause activation of an alert associated with an ADAS feature. The reliance level may measure how often an operator of vehicle 12 relies on ADAS alerts (both false positive and valid ADAS alerts) when compared to historical ADAS alert frequency data associated with the operator of vehicle 12 or other drivers of other vehicles that quantifies either how often the operator of vehicle 12 relied on ADAS alerts (both false positive and valid ADAS alerts) previously, and/or how often other drivers of other vehicles relied on ADAS alerts (both false positive and valid ADAS alerts).

For example, if a typical Chicago-based driver exhibits driving behavior that causes 100 ADAS alerts to activate in a vehicle, and the operator of vehicle 12, also a Chicago-based driver, exhibits driving behavior that causes 200 ADAS alerts to activate in vehicle 12, the reliance level may be expressed as 200/100, or 2. Based upon a pre-determined threshold, a reliance level of 2 may be considered too high, and may further indicate that the operator of vehicle 12 relied too heavily on ADAS 22 (e.g., 2 is above a threshold range of 1.0-1.9 that indicates a normal level of reliance), for example.

The reliance level may also be increased when the operator exhibits unresponsive driving behavior, such as when the operator of vehicle 12 follows a false positive ADAS alert in more instances than the operator has in the past, or in more instances than other drivers, according to historical ADAS alert frequency data associated with the operator of vehicle 12 or other drivers of other vehicles. For example, if the Chicago-based driver with the reliance level expressed as 2 caused 100 ADAS alerts to activate in a vehicle, as described above, and the operator followed or responded to 75 of the 100 ADAS alerts that were false positive, the reliance level may be greater than 2. Similarly, if the Chicago-based driver with the reliance level expressed as 2 caused 100 ADAS alerts to activate in a vehicle, as described above, and the operator did not follow 75 of the 100 ADAS alerts that were false positive, the reliance level may be less than 2.

In some embodiments, the reliance level may be increased when the operator exhibits safe or risk averse driving behavior, and the reliance level may be lowered when the operator exhibits unsafe or risky driving behavior.

Based upon the determination at block 308, an operator profile associated with the operator (e.g., in driver profiles database 76 of FIG. 1) may be set or adjusted to reflect the reliance level associated with an operator of the vehicle (block 310). Block 310 may correspond to the generation of a new driver profile and/or new driver profile fields, or to the update of an existing driver profile.

In some embodiments, the operator profile associated with the operator may be set or adjusted to reflect additional information associated with the operator that is not necessarily associated with the alert of the ADAS, in addition to the reliance level as depicted in block 310. For example, although not shown, method 300 may receive measurements data such as sensor data 104 (e.g., data indicating the number of passengers in the vehicle), driver-provided data 112 (e.g., age, gender, education level, profession), and/or third party data 114 (e.g., driver limitations), and the operator profile associated with the operator may be set or adjusted to reflect such data. For example, it may be determined that an operator of a vehicle has one or more limitations specific to a medical or physical condition, such as impaired vision (e.g., shortsightedness or poor night vision), that the operator has impaired motor skills (e.g., causing slow reaction times), that the operator is driving alone or has passengers in the vehicle, etc. Method 300 may receive such data after requesting one or more records from a remote server via a network (e.g., from third party server 18 of FIG. 1 via network 20), for example.

Although not shown, method 300 may further include transmitting, to a particular entity, at least the portion of the operator profile that was set at block 310, e.g., by generating an instruction to transmit the profile or a profile portion. The entity may be an entity (e.g., insurance institution) that improves a price to risk model associated with the operator based upon the profile or profile portion, an entity (e.g., financial institution) that improves a credit rating associated with the operator based upon the profile or profile portion, an entity (e.g., an insurer) that improves an insurance rating associated with the operator based upon the profile or profile portion, an entity (e.g., an employer) that reviews the profile or profile portion in connection with a job sought by the operator, or an entity (e.g., a rental vehicle company, taxi service, etc.) that offers a permanent or temporary credit (e.g., a discount or IOU), in connection with a good or service offered by the entity based upon the profile or profile portion, for example.

Generally, such ratings may improve in response to a consistent correlation representative of safe or risk averse driving behavior, and/or an inconsistent correlation representative of safe or risk averse driving behavior, as discussed above. Similarly, such ratings may worsen in response to a consistent correlation representative of unsafe or risky driving behavior, and/or an inconsistent correlation representative of unsafe or risky driving behavior, as discussed above. Such ratings may also adjust based upon additional information associated with a particular driving activity that is not necessarily associated with the alert of the ADAS, such as driver-provided data 112 (e.g., age, gender, education level, profession) and/or third party data 114 (e.g., driver limitations).

The method 300 may include additional, less, or alternate actions, including those discussed elsewhere herein.

In another aspect, a computer-implemented method for detecting and acting upon operator reliance to vehicle alerts may be provided. The method may include, via one or more processors, servers, sensors, and/or transceivers: (1) receiving user profile data of an operator including data associated with at least one driving activity aided by activation of an alert from a feature of an Advanced Driver Assistance System (ADAS); (2) comparing the user profile data with baseline ADAS alert frequency data; (3) determining a reliance level of the operator on the ADAS based upon the comparing; and/or (4) setting at least a portion of an operator or risk profile associated with the operator with the reliance level. The method may also include adjusting an insurance discount based upon the operator or risk profile to reward risk averse drivers. The method may include additional, less, or alternate actions, including those discussed elsewhere herein.

In another aspect, a computer system configured to determine, detect, and/or act upon operator reliance to vehicle alerts may be provided. The system may include one or more processors, servers, sensors, and/or transceivers configured to: (1) receive user profile data of an operator including data associated with at least one driving activity aided by activation of an alert from a feature of an Advanced Driver Assistance System (ADAS); (2) compare the user profile data with baseline ADAS alert frequency data; (3) determine a reliance level of the operator on the ADAS based upon the comparing; and/or (4) set at least a portion of an operator or risk profile associated with the operator with the reliance level. The system may include additional, less, or alternate functionality, including that discussed elsewhere herein.

In another aspect, a computer-implemented method for detecting and acting upon operator reliance to vehicle alerts may be provided. The method may include, via one or more processors, servers, sensors, and/or transceivers: (1) receiving user profile data of an operator, the user profile data including a baseline of at least one driving activity aided by activation of an alert from a feature of an Advanced Driver Assistance System (ADAS); (2) receiving historical ADAS alert frequency data including a history of at least one driving activity aided by activation of the alert from the ADAS feature; (3) comparing the user profile data with the historical ADAS alert frequency data, and/or baseline information; (4) determining if a reliance level is below a predetermined threshold based upon the comparing; and/or (5) if so, determining or generating an insurance discount to facilitate rewarding drivers that do not overly rely upon ADAS features. The method may include additional, less, or alternate actions, including that discussed elsewhere herein.

In another aspect, a computer system configured to detect, determine, and/or act upon operator reliance to vehicle alerts may be provided. The system may include one or more processors, servers, sensors, and/or transceivers configured to: (1) receive user profile data of an operator, the user profile data including a baseline of at least one driving activity aided by activation of an alert from a feature of an Advanced Driver Assistance System (ADAS); (2) receive historical ADAS alert frequency data including a history of at least one driving activity aided by activation of the alert from the ADAS feature; (3) compare the user profile data with the historical ADAS alert frequency data, and/or baseline information; (4) determine if a reliance level is below a predetermined threshold based upon the comparing; and/or (5) if so, determine or generate an insurance discount to facilitate rewarding drivers that do not overly rely upon ADAS features. The system may include additional, less, or alternate functionality, including that discussed elsewhere herein.

Exemplary Computer System for Generating and/or Using Driver Profiles

Figure 7:
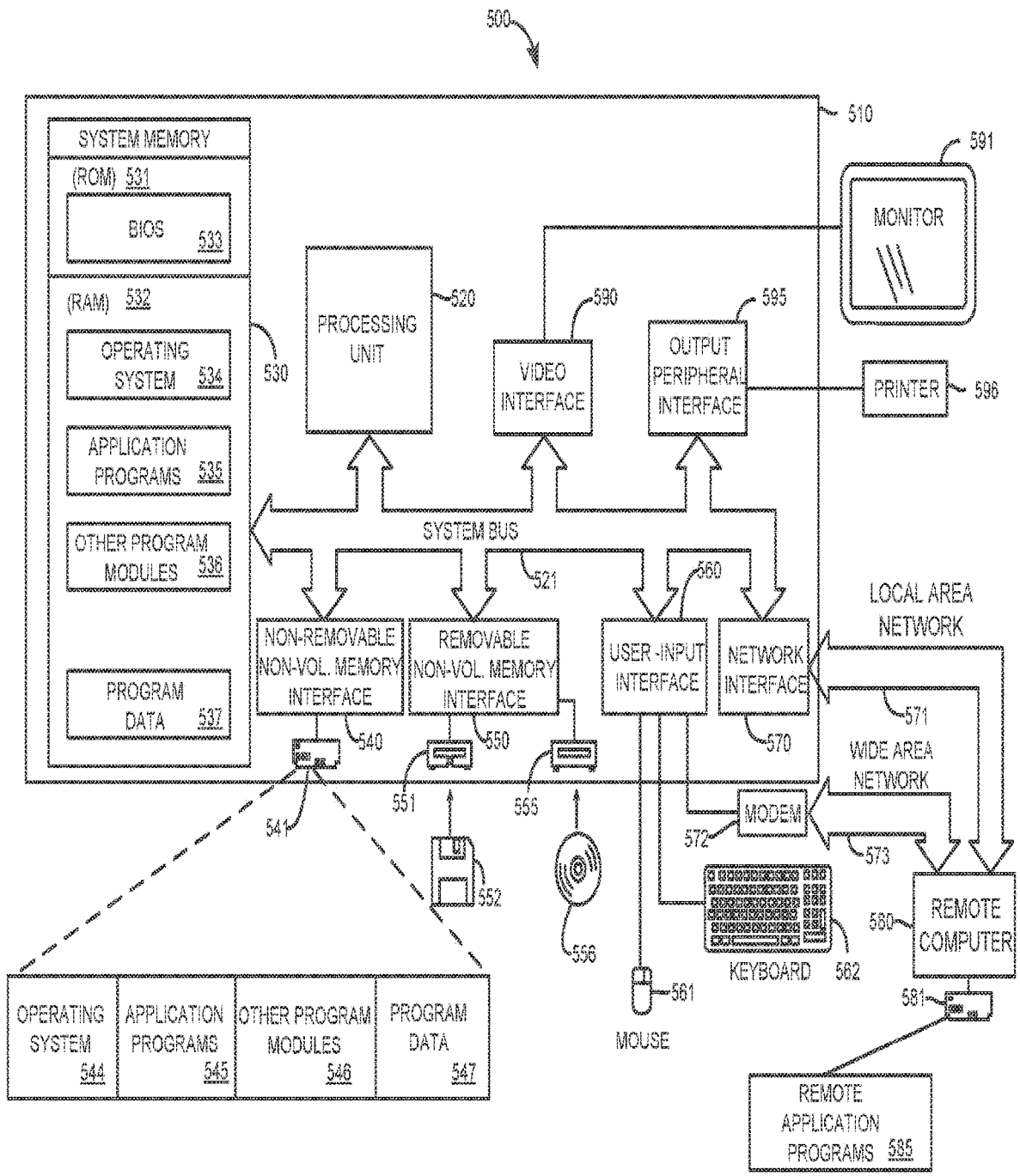
FIG. 7 is a block diagram of an exemplary computer system on which one or more of the embodiments described herein may be implemented.

FIG. 7 is a block diagram of an exemplary computer system 500 on which a computer-implemented method may operate in accordance with any of the embodiments described above. The computer system 500 of FIG. 7 includes a computing device in the form of a computer 510. Components of the computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 510 typically includes a variety of computer-readable media. Computer-readable media can be any available media that can be accessed by computer 510 and includes both volatile and nonvolatile media, and both removable and non-removable media. By way of example, and not limitation, computer-readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, read only memory (ROM), EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 510.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above are also included within the scope of computer-readable media.

The system memory 530 includes computer storage media in the form of volatile and/or nonvolatile memory such as ROM 531 and RAM 532. A basic input/output system (BIOS) 533, containing the basic routines that help to transfer information between elements within computer 510, such as during start-up, is typically stored in ROM 531. RAM 532 typically contains data and/or program modules that are immediately accessible to, and/or presently being operated on by, processing unit 520. By way of example, and not limitation, FIG. 7 illustrates operating system 534, application programs 535, other program modules 536, and program data 537.

The computer 510 may also include other removable/non-removable, volatile/nonvolatile computer storage media. By way of example only, FIG. 7 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 7 provide storage of computer-readable instructions, data structures, program modules and other data for the computer 510. In FIG. 7, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different reference numbers in FIG. 7 to illustrate that, at a minimum, they are different copies. A user may enter commands and information into the computer 510 through input devices such as a keyboard 562 and cursor control device 561, commonly referred to as a mouse, trackball or touch pad. A monitor 591 or other type of display device is also connected to the system bus 521 via an interface, such as a graphics controller 590. In addition to the monitor 591, computers may also include other peripheral output devices such as printer 596, which may be connected through an output peripheral interface 595.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 7. The logical connections depicted in FIG. 7 include a local area network (LAN) 571 and a wide area network (WAN) 573, but may also include other networks. Such networking environments are commonplace in hospitals, offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the input interface 560, or via another appropriate mechanism. In a networked environment, program modules depicted relative to the computer 510, or portions thereof, may be stored in the remote memory storage device 581. By way of example, and not limitation, FIG. 7 illustrates remote application programs 585 as residing on memory device 581.

The communications connections 570, 572 allow the device to communicate with other devices. The communications connections 570, 572 are an example of communication media, as discussed above.

The methods of any of the embodiments described above (e.g., methods 300, 320, 340, 400, and/or 420) may be implemented wholly or in part using one or more computer systems such as the computer system 500 illustrated in FIG. 7. Referring generally to the embodiments of FIG. 1, for example, the computer 510 may be used as some or all of computer system 16, with the units 80, 82, and 88 being instructions that are a part of application programs 535 stored in RAM 532 and/or application programs 545 stored in hard disk drive 541. As another example, data from on-board system 14 may be received via a modem similar to the modem 572, which may in turn be coupled to a network similar to network 20 of FIG. 1.

Technical Advantages

The aspects described herein may be implemented as part of one or more computer components, such a server device, for example. Furthermore, the aspects described herein may be implemented within a computer network architecture implementing vehicle telematics technology, and may leverage that architecture and technology to obtain new and beneficial results not previously achieved. Thus, the aspects described herein address and solve issues of a technical nature that are necessarily rooted in computer technology.

For instance, aspects described herein may include analyzing various sources of vehicle data to identify certain driving behaviors that are not captured or recognized by conventional systems, such as driver responsiveness to ADAS alerts. Without the improvements provided by capturing such driving behaviors, the assessment of driving behavior as it pertains to ADAS-installed vehicles would not be accurate, or may require much larger samples of telematics data to be collected and processed. Naturally, this would result in additional memory usage, processing resources, and/or time. Thus, aspects described herein address computer-related issues that are related to efficiency, processing, and storage metrics, such as consuming less power and/or memory, for example.

ADDITIONAL CONSIDERATIONS

With the foregoing, an insurance customer may opt-in to a rewards, insurance discount, or other type of program.

After the insurance customer provides their affirmative consent, an insurance provider remote server may collect data from the customer's mobile device, smart vehicle, autonomous or semi-autonomous vehicle, smart home controller, or other smart devices—such as with the customer's permission or affirmative consent. The data collected may be related to smart or autonomous vehicle functionality, smart home functionality (or home occupant preferences or preference profiles), and/or insured assets before (and/or after) an insurance-related event, including those events discussed elsewhere herein. In return, those insured may receive discounts or insurance cost savings related to auto, home, renters, personal articles, mobile, and other types of insurance from the insurance provider.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and 13 is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for generating, modifying, and/or using driver profiles through the principles disclosed herein. Thus, while particular embodiments and applications have been illustrated and described, it is to be understood that the disclosed embodiments are not limited to the precise construction and components disclosed herein. Various modifications, changes and variations, which will be apparent to those, skilled in the art, may be made in the arrangement, operation and details of the method and apparatus disclosed herein without departing from the spirit and scope defined in the appended claims.

What is claimed:

1. A computer-implemented method, carried out by a processor, for detecting and acting upon operator reliance to vehicle alerts, the method comprising:
   receiving, by the processor, user profile data of an operator, the user profile data including real time vehicle data from a vehicle of the operator, a status associated with the operator, and a first number of alerts of at least one driving activity that has been activated during a predefined time period or at a GPS data of a particular location from a feature of an Advanced Driver Assistance System (ADAS) associated with the vehicle of the operator;
   receiving, by the processor, historical ADAS alert frequency data including a plurality of baselines associated with one or more vehicles driven by one or more other drivers with various status;
   determining, by the processor, a subset of the historical ADAS alert frequency data based upon the status associated with the operator and the one or more other drivers, the subset of the historical ADAS alert frequency data including a baseline number of alerts of the at least one driving activity that has been activated during the predefined time period or at the GPS data of the particular location from the feature of the ADAS associated with one or more vehicles driven by one or more other drivers who have the same status as the operator;
   comparing, by the processor, the user profile data with the subset of the historical ADAS alert frequency data;
   determining, by the processor, a reliance level based upon the comparing;
   setting, by the processor, at least a portion of an operator profile associated with the operator with the reliance level;
   adjusting, by the processor, the baseline of the operator in response to a status change in the operator profile, wherein the comparing includes comparing the user profile data including the adjusted baseline with the historical ADAS alert frequency data; and
   causing, by the processor, transmission of at least a portion of the operator profile to an entity that offers a benefit relating to a good or service offered by the entity, based upon at least the portion of the operator profile.

2. The computer-implemented method of claim 1, further comprising:
   causing, by the processor, transmission of at least the portion of the operator profile to an entity that:
   adjusts a price to risk model associated with the operator based upon at least the portion of the operator profile, adjusts a credit rating associated with the operator based upon at least the portion of the operator profile, adjusts an insurance rating associated with the operator based upon at least the portion of the operator profile, reviews at least the portion of the operator profile in connection with a job sought by the operator.

3. The computer-implemented method of claim 1, further comprising: adjusting, by the processor, at least one of a price to risk model, a credit rating, an insurance rating, a review, a permanent credit, and a temporary credit associated with the operator based upon at least the portion of the operator profile.

4. The computer-implemented method of claim 1, further comprising: causing, by the processor, transmission of at least the portion of the operator profile to an entity that offers a permanent or temporary credit in connection with a good or service offered by the entity, based upon at least the portion of the operator profile.

5. The computer-implemented method of claim 1, wherein the historical ADAS alert frequency data is represented as an average number of times the alert from the ADAS feature was activated.

6. The computer-implemented method of claim 1, further comprising: selecting, by the processor, an operating parameter, wherein the comparing includes comparing the user profile data associated with the operating parameter with the historical ADAS alert frequency data associated with the operating parameter.

7. A computer system for detecting and acting upon operator reliance to vehicle alerts, the computer system comprising:

one or more processors; and a memory storing instructions that, when executed by the one or more processors, cause the one or more processors to:

receive user profile data of an operator, the user profile data including real time vehicle data from a vehicle of the operator, a status associated with the operator, and a first number of alerts of at least one driving activity that has been activated during a predefined time period or at a GPS data of a particular location from a feature of an Advanced Driver Assistance System (ADAS) associated with the vehicle of the operator;

receive historical ADAS alert frequency data including a plurality of baselines associated with one or more vehicles driven by one or more other drivers with various status;

determine a subset of the historical ADAS alert frequency data based upon the status associated with the operator and the one or more other drivers, the subset of the historical ADAS alert frequency data including a baseline number of alerts of the at least one driving activity that has been activated during the predefined time period or at the GPS data of the particular location from the feature of the ADAS associated with one or more vehicles driven by one or more other drivers who have the same status as the operator;

compare the user profile data with the subset of the historical ADAS alert frequency data;

determine a reliance level based upon the comparing;

set at least a portion of an operator profile associated with the operator with the reliance level;

adjust the baseline of the operator in response to a status change in the operator profile, wherein the comparing includes comparing the user profile data including the adjusted baseline with the historical ADAS alert frequency data; and causing the computer system to transmit at least a portion of the operator profile to an entity that offers a benefit relating to a good or service offered by the entity, based upon at least the portion of the operator profile.

8. The computer system of claim 7, wherein the instructions further cause the computer system to transmit at least the portion of the operator profile to an entity that:

adjusts a price to risk model associated with the operator based upon at least the portion of the operator profile, adjusts a credit rating associated with the operator based upon at least the portion of the operator profile, adjusts an insurance rating associated with the operator based upon at least the portion of the operator profile, or reviews at least the portion of the operator profile in connection with a job sought by the operator.

9. The computer system of claim 7, wherein the instructions further cause the computer system to adjust at least one of a price to risk model, a credit rating, an insurance rating, a review, a permanent credit, and a temporary credit associated with the operator based upon at least the portion of the operator profile.

10. The computer system of claim 7, wherein the historical ADAS alert frequency data is represented as an average number of times the alert from the ADAS feature was activated.

11. The computer system of claim 7, wherein the instructions further cause the computer system to:

select an operating parameter, wherein the comparing includes comparing the user profile data associated with the operating parameter with the historical ADAS alert frequency data associated with the operating parameter.

12. The computer system of claim 7, wherein the instructions further cause the computer system to:

cause the computer system to transmit at least the portion of the operator profile to an entity that offers a permanent or temporary credit, in connection with a good or service offered by the entity, based upon at least the portion of the operator profile.

13. A non-transitory, computer-readable medium storing instructions that, when executed by one or more processors, cause the one or more processors to:

receive user profile data of an operator, the user profile data including real time vehicle data from a vehicle of the operator, a status associated with the operator, and a first number of alerts of at least one driving activity that has been activated during a predefined time period or at a GPS data of a particular location from a feature of an Advanced Driver Assistance System (ADAS) associated with the vehicle of the operator;

receive historical ADAS alert frequency data including a plurality of baselines associated with one or more vehicles driven by one or more other drivers with various status;

determining, by the processor, whether at least one of the first number of alerts is a false positive alert or a valid alert by analyzing the user profile data and the historical ADAS alert frequency data;

determine a subset of the historical ADAS alert frequency data based upon the status associated with the operator and the one or more other drivers, the subset of the historical ADAS alert frequency data including a baseline number of alerts of the at least one driving activity that has been activated during the predefined time period or at the GPS data of the particular location from the feature of the ADAS associated with one or more vehicles driven by one or more other drivers who have the same status as the operator;
compare the user profile data with the subset of the historical ADAS alert frequency data;
determine a reliance level based upon the comparing;
set at least a portion of an operator profile associated with the operator with the reliance level;
adjust the baseline of the operator in response to a status change in the operator profile, wherein the comparing includes comparing the user profile data including the adjusted baseline with the historical ADAS alert frequency data; and
cause the computer system to transmit at least the portion of the operator profile to an entity that offers a benefit relating to a good or service offered by the entity, based upon at least the portion of the operator profile.

14. The non-transitory, computer-readable medium of claim 13, wherein the instructions further cause the one or more processors to:
cause the computer system to transmit at least the portion of the operator profile to an entity that offers a permanent or temporary credit, in connection with a good or service offered by the entity, based upon at least the portion of the operator profile.

15. The non-transitory, computer-readable medium of claim 13, wherein the instructions further cause the one or more processors to transmit at least the portion of the operator profile to an entity that:
adjusts a price to risk model associated with the operator based upon at least the portion of the operator profile,
adjusts a credit rating associated with the operator based upon at least the portion of the operator profile,
adjusts an insurance rating associated with the operator based upon at least the portion of the operator profile, or
reviews at least the portion of the operator profile in connection with a job sought by the operator.

16. The non-transitory, computer-readable medium of claim 13, wherein the instructions further cause the one or more processors to adjust at least one of a price to risk model, a credit rating, an insurance rating, a review, a permanent credit, and a temporary credit associated with the operator based upon at least the portion of the operator profile.

17. The non-transitory, computer-readable medium of claim 13, wherein the instructions, when executed by the one or more processors, cause the one or more processors to:
select an operating parameter,
wherein the comparing includes comparing the user profile data associated with the operating parameter with the historical ADAS alert frequency data associated with the operating parameter.

* * * * *